US012457706B2

(12) United States Patent
Vichare et al.

(10) Patent No.: US 12,457,706 B2
(45) Date of Patent: Oct. 28, 2025

(54) METHOD AND APPARATUS FOR A SELF DRIVING SILENT COOLING CONTROL SYSTEM

(71) Applicant: Dell Products, LP, Round Rock, TX (US)

(72) Inventors: Nikhil M. Vichare, Austin, TX (US); Travis C. North, Cedar Park, TX (US); Mitchell A. Markow, Hutto, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 379 days.

(21) Appl. No.: 18/104,234

(22) Filed: Jan. 31, 2023

(65) Prior Publication Data

US 2024/0260227 A1    Aug. 1, 2024

(51) Int. Cl.
H05K 7/20    (2006.01)
(52) U.S. Cl.
CPC ................ H05K 7/20209 (2013.01)
(58) Field of Classification Search
CPC ..... H05K 7/20; H05K 7/20136–20145; H05K 7/20154; H05K 7/20172; H05K 7/20181;
(Continued)

(56) References Cited

U.S. PATENT DOCUMENTS 7,545,640 B2    6/2009  Fisher
8,467,168 B2    6/2013  Honer
(Continued)

FOREIGN PATENT DOCUMENTS

WO    2007/112763 A1    10/2007
WO    2009/131980 A2    10/2009
(Continued)

Primary Examiner — Amir A Jalali
(74) Attorney, Agent, or Firm — Prol Intellectual Property Law, PLLC; H. Kenneth Prol

(57) ABSTRACT

An information handling system (IHS) includes a hardware processor, memory device, and a power management unit (PMU) to provide power to the processor and memory device. The IHS further includes a fan and fan motor operatively coupled to a motor driver hardware operated by the hardware processor and an ion emitter/collector blower cooling system including an ion emitter/collector blower, the ion emitter/collector blower including an ion emitter and an ion collector placed in fluidic series with the fan and an ionic driving circuit operatively coupled to the ion emitter via a high voltage to ionize gases at the ion emitter/collector blower to create charged ions that generate an airflow along a voltage field to and through the ion collector. The IHS further includes a hardware embedded controller to execute code instructions of a self-driving cooling system reinforcement learning agent of an ion emitter/controller blower and fan control system, the execution of the self-driving cooling system reinforcement learning agent to adjust and initiate operation of the ion emitter/collector blower and fan based on metrics including operating characteristics of the information handling system from user workload, and based on operational states of the information handling system as determined in a learned policy to operate the ion emitter/collector blower and fan.

20 Claims, 8 Drawing Sheets

(58) Field of Classification Search
CPC ............. H05K 7/2019; H05K 7/20209; H05K 7/20409; H05K 7/20718; H05K 7/20736; H05K 5/00; H05K 5/02; H05K 5/0213; H01L 23/34; H01L 23/367; H01L 23/3675; H01L 23/46–467; G06F 1/20; G06F 1/203; G06F 1/206; G06F 11/3058

See application file for complete search history.

(56) References Cited

U.S. PATENT DOCUMENTS

| | | | |
|---|---|---|---|
| 8,508,908 B2 | 8/2013 | Jewell-Larsen | |
| 8,807,204 B2 | 8/2014 | June | |
| 2005/0214180 A1 | 9/2005 | Joannou | |
| 2010/0037886 A1 | 2/2010 | Krichtafovitch | |
| 2010/0051709 A1 | 3/2010 | Krichtafovitch | |
| 2011/0036552 A1 | 2/2011 | Lu | |
| 2011/0261499 A1 | 10/2011 | Hizer | |
| 2011/0292593 A1* | 12/2011 | June | G06F 1/206 361/679.48 |
| 2012/0007742 A1 | 1/2012 | Gooch | |
| 2012/0008248 A1 | 1/2012 | Sawyer | |
| 2012/0057356 A1 | 3/2012 | Hizer | |
| 2012/0120542 A1* | 5/2012 | Zhang | H05K 7/20172 361/230 |
| 2012/0121487 A1* | 5/2012 | Jewell-Larsen | H01L 23/467 422/171 |
| 2012/0205079 A1* | 8/2012 | Jewell-Larsen | H05K 7/20172 165/104.34 |
| 2012/0268857 A1 | 10/2012 | Jewell-Larsen | |
| 2013/0021715 A1 | 1/2013 | Jewell-Larsen | |
| 2013/0056241 A1 | 3/2013 | Gao | |
| 2013/0153199 A1* | 6/2013 | Busch | F28F 27/00 165/287 |
| 2016/0265856 A1 | 9/2016 | Saveliev | |
| 2019/0014684 A1* | 1/2019 | Chiang | G06F 1/20 |
| 2019/0111405 A1* | 4/2019 | Katano | A61L 2/202 |
| 2023/0293753 A1* | 9/2023 | Pai | A61L 2/202 422/107 |
| 2024/0126351 A1* | 4/2024 | He | G06F 1/203 |

FOREIGN PATENT DOCUMENTS

| | | |
|---|---|---|
| WO | 2011/149667 A1 | 12/2011 |
| WO | 2012/006361 A2 | 1/2012 |

* cited by examiner

METHOD AND APPARATUS FOR A SELF DRIVING SILENT COOLING CONTROL SYSTEM

FIELD OF THE DISCLOSURE

The present disclosure generally relates to cooling systems for information handling system. The present disclosure more specifically relates to controlling an ion emitter/collector blower cooling system and/or cooling fan used to cool an information handling system using machine learning.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. Under various operating conditions, especially high-performance conditions, information handling systems may generate heat which, if not mitigated, may affect performance. The information handling system may thus include a cooling system used to cool hardware therein such as a hardware processing device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1A:
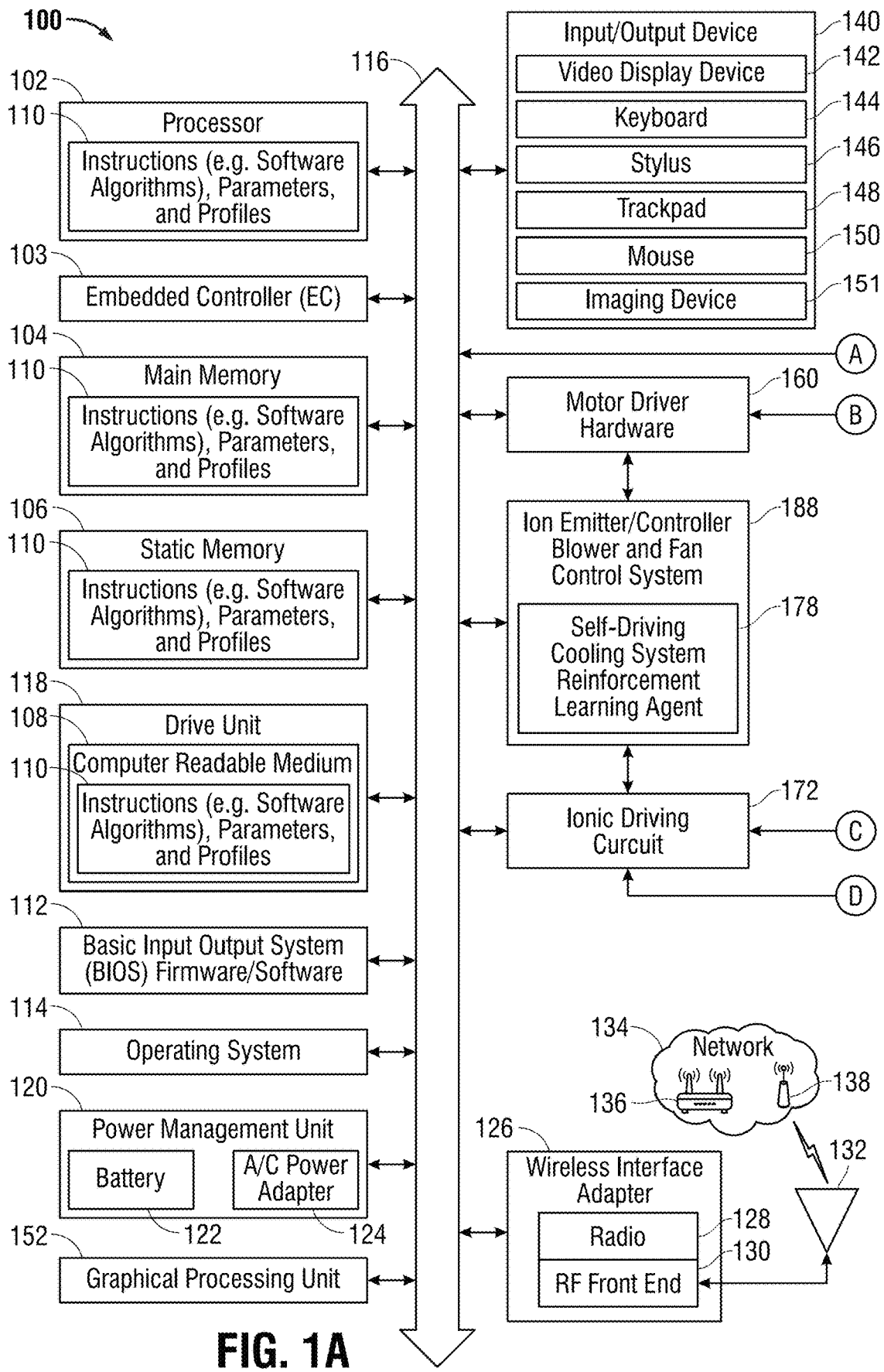
FIGS. 1A and 1B are a block diagrams linked via labels A, B, C, and D of an information handling system including an ion emitter/collector blower and fan control system with an ion emitter/collector blower, a cooling fan, and a self-driving cooling system reinforcement learning agent according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems operate to provide computing, data storage, and application resources among other computing resources. The hardware used to provide these resources to the user consume electricity. As a result of the consumption of this electricity, heat is produced within the housing or other structures used to house the hardware. Some information handling systems include a cooling fan used to blow heat from within the housing to a vent to vent the heated air from within the housing. However, these fans may create a higher degree of noise that may interfere with the use of the information handling system especially when the fan speed is increased due to increased power consumption and a resulting increase in temperature within the housing. Still further, look-up tables or other software or firmware form policies that may be used to control the speed of rotation of the fan but may only react to detected increases in temperature and do not accommodate for anticipated contexts under which the information handling system is operated under.

The present specification describes an information handling system that includes a hardware processor, memory device, and a power management unit (PMU) to provide power to the hardware processor and memory device. The information handling system further includes a fan and fan motor operatively coupled to a motor driver hardware operated by the hardware processor. In a further embodiment, an ion emitter/collector blower and fan cooling system place the fan in series with an ion emitter/collector blower. The ion emitter/collector blower includes an ion emitter and an ion collector placed in fluidic series with each other and the fan. In an embodiment, the ion emitter/collector blower is operatively coupled to an ionic driving circuit with the ionic driving circuit operatively coupled to the ion emitter to generate a high voltage to ionize gases at the ion emitter to create charged ions that generate an airflow along a voltage field to and through the ion collector of the ion emitter/collector blower.

The information handling system, in an embodiment, further includes a hardware embedded controller to execute code instructions of a self-driving cooling system reinforcement learning agent that is part of an ion emitter/collector blower and fan control system. The execution of the self-driving cooling system reinforcement learning agent that is part of an ion emitter/collector blower and fan control system operating the ion emitter/collector blower and fan is based on detected metrics including operating characteristics of the information handling system by the user, operational states of the information handling system, internal temperatures, and historic and current operation of the fan and ion emitter/collector blower. In an embodiment, the embedded controller executes code instructions of the self-driving cooling system reinforcement learning agent to prioritize the operation of the ion emitter/collector blower over initialization of the fan under various operating conditions. The prioritization of the initiation and operation of the ion emitter/collector blower before the initiation and operation of the fan mitigates noise by using the ion emitter/collector blower first then engaging the fan when temperatures increase above what the ion emitter/collector blower can control. The execution of the code instructions of the self-driving cooling system reinforcement learning agent by a hardware processor maximizes performance metrics of the workload associated with the operation of the information handling system while minimizing the operation of the fan in order to maximize the silent or near silent operation of the information handling system by prioritization of the ion emitter/collector blower via the ion emitter/collector blower and fan control system.

The execution of the self-driving cooling system reinforcement learning agent control system by the embedded controller or hardware processor includes, in an embodiment, the use of a machine learning (ML) reinforcement learning code instructions to accommodate for the use scenarios of the information handling system described herein. For example, the environment the information handling system is used within as described herein, and other factors that influence the temperature within the information handling system and the effects on the user during operation are detected and input into the reinforcement learning code instruction system executing on an embedded controller or other hardware processor. The self-driving cooling system reinforcement learning agent may receive input describing detected states of the information handling system, detected context in which the information handling system is being used, operation of the ion emitter/collector blower and fan control cooling system (e.g., operations of the fan and ion emitter/collector blower), and the metrics associated with the operation of the information handling system. The self-driving cooling system reinforcement learning agent may then instruct the ion emitter/collector blower and fan control system to take actions such as initiating the ion emitter/collector blower and/or fan and controlling the operation of the ion emitter/collector blower and/or fan.

In an embodiment, during operation, the self-driving cooling system reinforcement learning agent, the outcomes of the actions taken (e.g., reduced temperature, increased temperature, increase in ozone levels produced by ion emitter/collector blower, etc.) are used as reinforcement learning inputs in the machine learning engine reinforcement learning software code of the self-driving cooling system reinforcement learning agent to iteratively improve the operation of the ion emitter/collector blower cooling system. In an embodiment, the execution of code instructions for the self-driving cooling system reinforcement learning agent by the embedded controller calculates weighted rewards resulting from detected positive metrics resulting from actions executed by the embedded controller executing code instructions of the ion emitter/collector and fan control system to operate the ion emitter/collector blower and fan. The weighted rewards are determined from detected negative metrics resulting from actions executed by the embedded controller executing code instructions of the ion emitter/collector and fan control system to operate the ion emitter/collector blower and fan. In an embodiment, the execution of the self-driving cooling system reinforcement learning agent by the embedded controller subtracts a set of negative weighted rewards resulting from detected negative metrics resulting from actions executed by the embedded controller executing code instructions of the ion emitter/collector and fan control system to operate the ion emitter/collector blower and fan from a set of positive weighted rewards resulting from detected positive metrics resulting from actions executed by the embedded controller executing code instructions of the ion emitter/collector and fan control system to operate the ion emitter/collector blower and fan.

In an embodiment, the self-driving cooling system reinforcement learning agent may receive data detected by one or more sensors or devices (e.g., a hardware processing device) that indicate an operating mode of the information handling system operating under a performance mode requiring an increased level of processor resource utilization and where the ion emitter/collector blower has reached a maximum operating capacity. In an embodiment, the ion emitter/collector blower and fan control system, under the direction of the self-driving cooling system reinforcement learning agent executed by a hardware processing device, sets a fan speed of the fan upon the detection of certain operating modes such as the performance mode. The self-driving cooling system reinforcement learning agent, executed by a hardware processor, may also detect another operating mode that is not a performance mode that may change the fan speed of the fan in an embodiment. In an embodiment, where the ion emitter/collector blower has reached a maximum operating capacity, the ion emitter/collector blower and fan control system sets a fan speed of the fan to a low-range airflow under the direction of the self-driving cooling system reinforcement learning agent executed by the hardware processor.

Figure 1B:
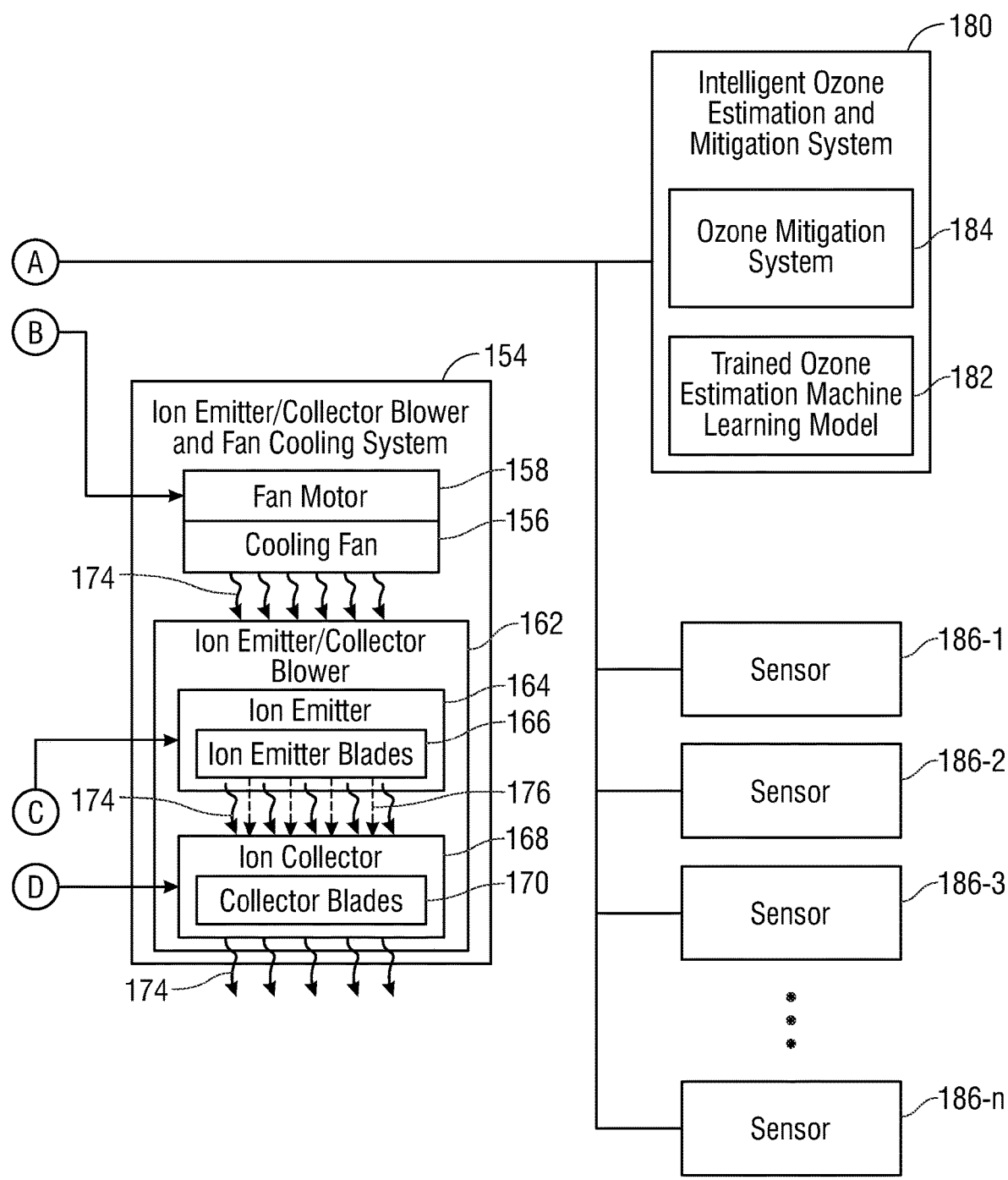

FIGS. 1A and 1B illustrates an information handling system 100 similar to information handling systems according to several aspects of the present disclosure that is operatively coupled to an ion emitter/collector blower cooling system 154 formed within a housing of the information handling system. FIGS. 1A and 1B are a block diagrams linked via labels A, B, C, and D of an information handling system 100 including an ion emitter/collector blower and fan control system 188 with an ion emitter/collector blower 162, a cooling fan 156, and a self-driving cooling system reinforcement learning agent 178 according to an embodiment of the present disclosure. The information handling system 100 executes, with a hardware processor, embedded controller, or other hardware processing resource, code instructions of a self-driving cooling system that is part of an ion emitter/collector blower and fan control system 188 reinforcement learning agent 178 and intelligent ozone estimation and mitigation system 180 that is part of the ion emitter/collector blower and fan control system 188 formed within a housing of the information handling system. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a two-in-one computer, a tablet, a smartphone, a communications device, an access point (AP), a base station transceiver, a wireless telephone, a control system, a camera, a scanner, a printer, a personal trusted device, a web appliance, or any other suitable machine capable of executing a set of machine-readable code instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing, via a hardware processing resource, a set of machine-readable code instructions (sequential or otherwise) that specify actions to be taken by that machine. In an embodiment, the information handling system 100 may be operatively coupled to a server or other network device as well as with any wireless peripheral devices. Further, while a single information handling system 100 is illustrated, the term "system" shall also be taken to include any collection of systems or sub-systems that individually or jointly utilized one or more hardware processing resources to execute a set, or multiple sets, of machine-readable code instructions to perform one or more machine functions.

The information handling system 100 may include memory (volatile (e.g., random-access memory, etc.), nonvolatile (read-only memory, flash memory etc.) or any combination thereof), one or more hardware processing resources, such as a central processing unit (CPU) 102, a graphics processing unit (GPU) 152, an embedded controller (EC) 103, other hardware processing device, hardware controller, or any combination thereof. Additional components of the information handling system 100 can include one or more storage devices, one or more communications ports for communicating with external devices, as well as various input and output (I/O) devices 140, such as a keyboard 144, a mouse 150, a video display device 142, a stylus 146, a trackpad 148, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the hardware devices or hardware processing resources to execute machine-readable code instructions for the one or more systems and modules described above, and operates to perform one or more of the methods described herein. For example, machine-readable code instructions may be executed by an EC 103, a PMU controller, or other hardware processing resource for an ion emitter/collector blower cooling system 154 to control the ion emitter/collector blower 162 and cooling fan 156 based on the execution of code instructions of the self-driving cooling system reinforcement learning agent 178 and an ion emitter/collector and fan control system 188 in embodiments herein. The information handling system 100 may execute machine-readable code instructions 110 via hardware processing resources that may operate on servers or systems, remote data centers, or on-box in individual client information handling systems according to various embodiments herein. In some embodiments, it is understood any or all portions of machine-readable code instructions 110 may operate on a plurality of information handling systems 100.

The information handling system 100 may include hardware processing resources such as a hardware processor 102, a central processing unit (CPU), accelerated processing unit (APU), a neural processing unit (NPU), a vision processing unit (VPU), an embedded controller (EC) 103, a digital signal processor (DSP), a GPU 152, a microcontroller, or any other type of hardware processing device that executes machine-readable code instructions to perform the processes described herein. Any of the hardware processing resources may operate to execute code that is either firmware or software code. Moreover, the information handling system 100 can include memory such as main memory 104, static memory 106, computer readable medium 108 storing machine-readable code instructions 110 of, in an example embodiment, an ion emitter/collector blower and fan control system 178 (e.g., controlled by a power management unit (PMU) hardware controller hardware processor 102, or an embedded controller 103), or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, or a gesture or touch screen input device associated with the video display device 142 that allow a user to interact with the images, windows, and applications presented to the user. In an embodiment, the video display device 142 may provide output to a user that includes, for example, one or more windows describing one or more instances of applications being executed by the hardware processor 102 of the information handling system. In this example embodiment, a window may be presented to the user that provides a graphical user interface (GUI) representing the execution of that application.

The network interface device of the information handling system 100 shown as wireless interface adapter 126 can provide connectivity among devices such as with Bluetooth® or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to one or more of the peripheral devices that may include a wireless video display device 142, a wireless keyboard 144, a wireless mouse 150, a wireless headset, a microphone, a wireless stylus 146, and a wireless trackpad 148, among other wireless peripheral devices used as input/output (I/O) devices 140.

The wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth® wireless link using a Bluetooth® wireless or Bluetooth® Low Energy (BLE). In an embodiment, the Bluetooth® wireless protocol may operate at frequencies between 2.402 to 2.48 GHz.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums.

The wireless interface adapter 126 can represent an add-in card, wireless network interface module that is integrated with a main board of the information handling system 100 or integrated with another wireless network interface capability, or any combination thereof. In an embodiment the wireless interface adapter 126 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication. The RF subsystems and radios 128 and include wireless controllers to manage authentication, connectivity, communications, power levels for transmission, buffering, error correction, baseband processing, and other functions of the wireless interface adapter 126.

As described herein, the information handling system 100 may include and be operatively coupled to an ion emitter/collector blower and fan cooling system 154. The ion emitter/collector blower and fan cooling system 154 may include a cooling fan 156 and an ion emitter/collector blower 162 coupled within a housing of the information handling system 100 in an embodiment so that heat generated by the operation of the heat generating hardware (e.g., hardware processor 102, memory devices 104, 106, PMU 120, CPU, GPU, etc.) may be directed out of the housing of the information handling system 100 via an air exhaust vent formed in the housing (e.g., at a top side surface of the housing of the information handling system 100). The ion emitter/collector blower and fan cooling system 154 may include the ion emitter/collector blower 162 that may, in an example embodiment, include a housing used to house the components of the ion emitter/collector blower 162 described herein in an embodiment. In an alternative embodiment, the ion emitter/collector blower 162 does not include a housing and instead, those components of the ion emitter/collector blower and fan cooling system 154 are operatively coupled to an interior surface of the housing of the information handling system 100. For ease of discussion, the ion emitter/collector blower 162 of the ion emitter/collector blower and fan cooling system 154 will be described as including a housing which allows the ion emitter/collector blower 162 to be modular and replaced if necessary.

The ion emitter/collector blower 162 of the ion emitter/collector blower and fan cooling system 154 includes an ion emitter 164. In an embodiment, the ion emitter 164 includes a plurality of ion emitter blades 166 through which air may pass and which are used to create an airflow into, through, and out of the ion emitter/collector blower 162. The number of ion emitter blades 166 may vary depending on an anticipated level of heat generation by the hardware components within the information handling system 100, and the shape and design of the housing of the ion emitter/collector blower 162, or housing of the information handling system 100, among other factors. Each of the ion emitter blades 166 are coupled to an electrode of a high voltage source of an ionic driving circuit 172. In an embodiment, each of the ion emitter blades 166 includes a blade edge. In one embodiment, the blade edges may be made to come to a sharp point in order to facilitate the creation of more ions 172 than would otherwise be created from a flat or non-sharped edge.

In an embodiment, the ions created at the ion emitter may be increased via application of a higher voltage to the ion emitter blades 166. The creation of more ions also creates more airflow through the ion emitter/collector blower 162 thereby increasing the ability of the ion emitter/collector blower 162 to cool down systems or hardware better. At a point, the amount of voltage applied to the ion emitter 164 may not be increased due to the possibility of arcing between the ion emitter 164 and ion collector 168. This upper limit of voltage may define the maximum amount of airflow that can be created by the ion emitter/collector blower 162.

In an embodiment, the ion emitter/collector blower 162 and the ion emitter blades 166 may be made of a refractory metal such as niobium, chromium, molybdenum, tantalum, tungsten, and rhenium among others. In an embodiment, the portions of the ion emitter/collector blower 162 and ion emitter blades 166 may be electroplated with a refractory metal such as niobium, chromium, molybdenum, tantalum, tungsten, and rhenium among others with an interior layer of the ion emitter blades 166 being made of a conductive material such as iron. It is appreciated that the ion emitter blades 166 may be made of any alloy of metal that includes alloys of those refractory metals described herein.

The ion emitter/collector blower 162 also includes an ion collector 168. In an embodiment, the ion collector 168 includes a plurality of ion collector blades 170 through which air may pass and which are used to deionize those ions 176 created at the ion emitter 164 as described herein. The number of ion collector blades 170 may vary depending on an anticipated level of heat generation by the hardware components within the information handling system 100 and the shape and design of the housing of the ion emitter/collector blower 162, or the housing of the information handling system 100, among other factors such as the creation of ions 176 at the ion emitter 164. Each of the ion collector blades 170 are coupled to an electrode of a high voltage source of an ionic driving circuit 172 in an embodiment. In an embodiment, the ion collector blades 170 are coupled to a grounding source used to prevent arcing between the ion emitter 164 and ion collector 168. In an embodiment, each of the ion collector blades 170 includes a blade edge. It is appreciated that the ion collector blades 170 may be made of any alloy of metal that includes alloys of those refractory metals described herein.

As described herein, the ion emitter 164 and its ion emitter blades 166 as well as the ion collector 168 and its ion collector blades 170 are electrically coupled to a high voltage source (e.g., 2 kV to 10 kV voltage source difference between the ion emitter 164 and the ion collector 168). In an embodiment, the ionic driving circuit 172 may include a boost converter that provides, for the high voltage source of the ionic driving circuit 172, those voltages described herein to the ion emitter 164 and ion collector 168. Control of voltage levels from the ionic driving circuit 172 and PMU 120 power to the ion emitter/collector blower 162 may be managed by execution of code instructions of the ion emitter/collector blower and fan control system 178 by the EC 103, PMU controller, or some combination to select an airflow level or ramp up airflow production.

As described in embodiments herein, the ion emitter 164 of the ion emitter/collector blower 162 may be operatively coupled to an ionic driving circuit 172. In an embodiment, the ionic driving circuit 172 is controlled via the execution of code instructions of an ion emitter/collector blower and fan control system 188 on the hardware processor 102, the PMU 120 with a hardware controller, an embedded controller 103, or the like. The ionic driving circuit 172, in an embodiment, includes or is coupled to a high voltage source that is operatively coupled to the ion emitter/collector blower 162. In an embodiment, the high voltage source may include a boost converter that steps up voltage from its input (e.g., a battery 122 or AC power adapter 124) to the output at the ion emitter 164 and/or the ion collector 168 of the ion emitter/collector blower 162. The high voltage source of the ionic driving circuit 172 causes the ion emitter 164 to emit ions 176 from the edges of each ion emitter blades 166. Some variation may be allowed from a voltage minimum to the voltage maximum to adjust airflow capacity of the ion emitter/collector blower 162. In the context of the present specification, the term "emit" or "emitter" is meant to describe an action and device that, at its edges or other surfaces, creates ions 176 and, via an electromagnetic repulsion, repels those ions 176 towards an attracting, oppositely charged source such as the ion collector 168 described herein. In an embodiment, the high voltage source of the ionic driving circuit 172 causes electrons to be ripped away from certain molecules such as gas molecules in the atmosphere thereby creating ions 176 (e.g., positively-charged ions 176) at the edges or other surfaces of the ion emitter blades 166. This ionization process may include the removal of one or more electrons from the outer valence shells of the individual molecules within the gas such that they become positively charged (e.g., cations) in an embodiment. Higher voltage may generate more ions up to a limit of airflow available via the ion emitter/collector blower 162. In an example where the interior of the housing of the ion emitter/collector blower 162 includes atmospheric air, any number of types of gas molecules may be subjected to this process. For example, where the gas includes oxygen ($O_2$), the ionization of oxygen may include the removal of a single electron or two electrons from the oxygen molecule. This may lead to a $O_2^+$ or $O_2^{2+}$ ion (e.g., cation molecules or individual atoms) being created by the ion emitter/collector blower 162 and ionic driving circuit 172 in an embodiment. Other gas molecules or molecules within the atmosphere within the ion emitter/collector blower 162 may similarly be ionized such as nitrogen, carbon dioxide, argon, hydrogen, etc. to create other ions 172 such as $N^{+1}$, $N^{+2}$, $N^{+3}$, $N^{+4}$, $N^{+5}$, $O_3$ (ozone), $H^{+1}$.

This ionization of the atmospheric gases within ion emitter/collector blower 162 helps to cause an airflow 174 into, within, and out of the ion emitter/collector blower 162. In an embodiment, the movement of the ions 176 from the ion emitter 164 to the ion collector 168 creates a shearing force on the air (e.g., ionized molecules drag non-ionized molecules) within the ion emitter/collector blower 162. With higher voltage levels, a greater number of ions are generated providing more shearing force up to a limit. This shearing force pulls the other air molecules in the direction of the magnetic pull of the ions 172 created by the ion emitter 164 towards the ion collector 168 thereby creating this airflow 174. In an embodiment, the movement of the ions 176 created and emitted from the ion emitter 164 may be from the ion emitter 164 to the ion collector 168. In an example embodiment, the ion emitter 164 may each be operatively coupled to a positive electrode of the high voltage source of the ionic driving circuit 172. As a result of generating the positively charged ions 176, the charged ion emitter 164 now repels those positively charged ions 176 causing the charged ions 176 to be repelled away from the ion emitter 164, following the electric field created between the ion emitter 164 and ion collector 168, and attracted to the ion collector 168.

In an embodiment, the ion collectors 168 and ion collector blades 170 are each operatively coupled to a negative or opposite electrode of the high voltage source of the ionic driving circuit 172. In an embodiment, the ion collector 168 are operatively coupled to a grounding source or high voltage negative source of the ionic driving circuit 172. Whether the ion collector 168 is operatively coupled to a negative electrode of the high voltage source or to ground of the high voltage source of the ionic driving circuit 172, the voltage difference between the ion emitter 164 and the ion collector 168 determines an electric field between ion emitter 164 and the ion collector 168. The ions 176 created by the ion emitter 164 follow this electric field. In an embodiment where the ion collector 168 is operatively coupled to a negative electrode of the high voltage source and not ground, the ion collector 168 may be electrically insulated from the remaining portions of the ion emitter/collector blower 162 and its housing. In an embodiment, this electrical isolation may be accomplished by making the housing of the ion emitter/collector blower 162 out of an electrically non-conductive material such as plastic. In an embodiment, the electrical isolation may be accomplished by placing an insulative gasket between the ion collector 168 and a housing of the ion emitter/collector blower 162 and the ion emitter 164. The electrical isolation of the ion collector 168 allows for the electrical field between the ion emitter 164 and ion collector 168 to be formed allowing for an electrical field path for the ions 176 to follow.

In an embodiment, the creation of the electric field between the ion emitter 164 and ion collector 168 causes the positively-charged ions 176 created by the ion emitter 164 to be attracted to the negatively charged ion collector 168 further causing movement of the ions 176 and creating the airflow 174 described herein. As the positively-charged ions 176 reach the ion collector 168, those missing valence electrons stripped away by the ion emitter 164 at the ions 172 may be added to a valence shell of the ionized molecules placing those gases at a neutral electrical charge again. Following the example of the ionization of the oxygen molecules in the atmospheric gases within the ion emitter/collector blower 162 by the ion emitter 164, as these $O_2^+$ or $O_2^{2+}$ ions 176 (e.g., cations) have their extraneous electrons returned from at their valence electron shells (e.g., a single electron or two electrons, respectively) the oxygen molecules are placed in an electrically neutral state.

In an embodiment, the creation of this airflow 174, via the operation of the ion emitter/collector blower 162 and ionic movement of the ions 176 created by the ion emitter 164, has a low-pressure head of around 0.04 to 0.05 inches of $H_2O$ (water column) as compared to the rotation of a fan (e.g., fan 156) or another type of blower that may have a pressure head of around 0.5 inches of $H_2O$. However, the flow rate of air into and out of the ion emitter/collector blower 162 via operation of the ion emitter 164 creating ions 176 is relatively higher than the potential flow rate of air created by the rotation of a fan 156 by itself. Further, creation of airflow 174 by the ion emitter/collector blower 162 is virtually silent. For purposes of the present specification, the term "pressure head" is defined as the height of a fluid (e.g., air, water or other fluids) column that corresponds to a particular pressure exerted by the fluid column corresponding to pressure or psi of airflow created by the ionization of air. With the relatively high airflow rate with lower pressure head of the ion emitter/collector blower 162, the acoustics of the ion emitter/collector blower 162 are near silent and lower than the fan 156 in an embodiment when the fan 156 is not used. For this reason, it may serve as a first source of active airflow generation before initiation or capacity increases are instructed by the ion emitter/collector blower and fan control system 178 in embodiments herein.

As described herein, the airflow 174 created by the ion emitter/collector blower 162 may be supplemented by an airflow generated by the operation of a cooling fan 156. In an embodiment, the cooling fan 156 may be placed upstream or at an air intake of the ion emitter/collector blower 162 so that air may pass through a housing of the cooling fan 156, enter the ion emitter/collector blower 162, and be accelerated through the housing of the ion emitter/collector blower 162 and out of the ion emitter/collector blower 162. This series arrangement of the fan 156 to the ion emitter/collector blower 162 allows for the selective activation of the fan 156, the ion emitter/collector blower 162, or both based on, for example, a temperature detected within the chassis of the information handling system 100, specific hardware devices within the housing, or a combination of hardware devices within the housing of the information handling system 100. Selective activation may be conducted by the ion emitter/collector blower and fan control system 154 and further control of levels of capacity for the ion emitter/collector blower 162 and the cooling fan 156 may be controlled according to various embodiments herein. In an embodiment, execution of the ion emitter/collector blower and fan control system 188 by a hardware processor controls the activation of the motor driver hardware 160 in order to control the fan motor 158 to activate or deactivate the fan 156 and/or control the speed of the fan 156. Control of capacity of the ion emitter/collector blower 162, for example, may be linearly increased as temperature or power is increased within the information handling system until the ion emitter/collector blower 162 reaches a maximum capacity in an example embodiment. In an alternative embodiment, the power consumed by one or more hardware devices within the information handling system 100 may indicate if and when the cooling fan 156, the ion emitter/collector blower 162, or both are activated to create an airflow through the housing of the information handling system 100. In an embodiment, the cooling fan 156 may be placed within a fan housing in an embodiment. The cooling fan 156 may be rotated by a fan motor 158 and motor driver hardware 160 as instructed by the hardware processor 102.

In an embodiment, the ion emitter/collector blower and fan control system 188 includes a self-driving cooling system reinforcement learning agent 178 that may be executed (e.g., by a hardware processor such as embedded controller 103) to control the operations of both the ion emitter/collector blower 162 and the cooling fan 156. For example, with the operation of the ion emitter/collector blower 162 may be prioritized over the operation of the cooling fan 156 in an embodiment based on several inputs into a trained reinforcement learning machine learning engine. In another embodiment, ozone generation may be detected and mitigated as well via execution of a trained ozone estimation machine learning model 182 under direction of the ion emitter/collector fan control system 188 and the self-driving cooling system reinforcement learning agent 178. As described herein, the self-driving cooling system reinforcement learning agent 178 may include computer readable program code that is executable by a hardware processing device (e.g., hardware processor 102, an embedded controller, a CPU, a GPU, and the like) that is based on feedback metrics. Initial state and user context data may be provided to the self-driving cooling system reinforcement learning agent 178 including operating characteristics of the information handling system by the user and operational states of the information handling system. Other data may be provided as well to increase the reinforcement learning capabilities of the self-driving cooling system reinforcement learning agent 178 in an embodiment.

The self-driving cooling system reinforcement learning agent 178 implements a reinforcement learning process and algorithm to control the operations of both the ion emitter/collector blower 162 and the cooling fan 156 in an embodiment. A reinforcement learning algorithm may include code instructions of a machine learning engine that, with data describing specific environment and states of the information handling system 100, takes a set of actions, detects an outcome of those actions taken, defines the outcomes as either a positive reward or negative reward, subtracts a summation of the negative rewards from a summation of the positive rewards, and uses that data as input in a reiterative manner to improve the operation of, in the example embodiments herein, the ion emitter/collector blower cooling system 154 (e.g., the ion emitter/collector blower 162 and cooling fan 156). To execute the self-driving cooling system reinforcement learning agent 178, the hardware processor 102 or embedded controller 103 may first detect one or more metrics including the operating characteristics of the information handling system 100 by the user and the operational states of the information handling system 100 among other environmental and operating characteristics associated with the information handling system 100.

For example, an operating state of the information handling system 100 may include hardware utilization levels that detect. A hardware utilization level may include the processing resources used at the hardware processor 102, a CPU, the GPU 152 or other hardware processing device, battery power consumption, AC power consumption, memory read/write processes, and the like. Another operating state of the information handling system 100 includes the execution of foreground and/or background applications. Another operating state of the information handling system 100 includes settings associated with a BIOS 112 and OS 114 including processor throttling settings or lack thereof, executed driver software, RAM usage, and the like.

Yet another operating state of the information handling system 100 includes power settings and modes such as whether the information handling system 100 is drawing power from a battery 122 or an AC power adapter 124 and whether the user has selected for the information handling system 100 to operate in a power mode, a performance mode, or a quiet mode or some combination thereof. In the context of the present specification, a performance mode may be an operating mode under which the information handling system 100 prioritizes the performance of the information handling system 100 that includes prioritizing the power limits to maximize performance especially when executing program applications such as the hardware processor 102 associated with content creation. In the context of the present specification, a power mode may be an operating mode under which the information handling system 100 prioritizes the power consumption by the hardware devices when, for example, the information handling system 100 is operating on power provided by the battery 122. In the context of the present specification, a quiet mode may be an operating mode that prioritizes the deactivation of the cooling fan 156 and activation of the ion emitter/collector blower 162 in order to reduce the noise created by the cooling fan 156 during operation. This quiet mode may take into consideration the thermal characteristics of the information handling system 100 as it operates (e.g., thermal temperatures of hardware devices such as the hardware processor 102 or GPU 152) as well as acoustic settings set by a user (e.g., user-selected thermal tables, etc.).

In an embodiment, the operational characteristics of the information handling system by the user includes the detection of the presence of a user at or near the information handling system 100. In an embodiment, the information handling system 100 includes a camera, a web cam, thermal camera, or other similar imaging device 151. This imaging device 151 may be used to determine whether the user is in front of the imaging device 151 and, accordingly, in front of or near the information handling system 100. The focus of the user and/or the focus of the user relative to the focus of the background or foreground may also be detected and used as an operational characteristic of the information handling system by the user (e.g., out of focus means the user is too close or too far away from the information handling system 100).

The orientation of the information handling system 100 may also be used, in an example embodiment, as part of the operational characteristics of the information handling system by the user. In an example, the information handling system 100 may be a laptop-type information handling system that includes a base portion operatively coupled to a display portion via a hinge. The orientation of this base portion relative to the display portion may define one of a closed orientation, a laptop orientation, a tablet orientation, a dual tablet configuration, and a tent orientation, among other orientations. The closed orientation is an orientation where the display portion of the laptop-type information handling system 100 is closed onto the base portion of the information handling system 100 with the display of the display portion not being visible. The tablet configuration is an orientation where the information handling system is in a tablet form or where the base portion of the information handling system is made to flip behind the display portion. In a dual tablet configuration, the information handling system 100 may be made of a base portion that includes a separate base chassis display device along with the display device of the display portion of the information handling system or a single foldable display that may span both chassis of a dual-display information handling system 100. In this dual tablet configuration, the base portion and display portion are laid open to reveal both display devices or an entire foldable display to the user. In a laptop configuration, the information handling system may have the base portion on a table or on the user's lap with the display portion upright and viewable to the user. In a tent configuration, the display portion may be viewable to the user with the base portion in an orientation to prop up the display portion on a table, for example. It is appreciated that the orientation of the information handling system 100 is different where the information handling system 100 is a tablet-type information handling system. The placement of the user relative to the information handling system 100 may be used as a metric by the self-driving cooling system reinforcement learning agent 178 to mitigate, when necessary, amounts of ozone that are produced by operation of the ion emitter/collector blower 162 as described below.

In an embodiment, an operational characteristic of the information handling system by the user may also include a location of a user such as whether the user and the information handling system 100 are indoors or outdoors. Similar to above, the location of the user and the information handling system 100 may also be used as a metric by the self-driving cooling system reinforcement learning agent 178 to mitigate, when necessary, amounts of ozone that are produced by operation of the ion emitter/collector blower 162 as described below.

In an embodiment, an operating characteristic of the information handling system 100 includes audio/video profiles. It is appreciated that audio produced by one or more speakers in the information handling system 100 may drown out other sounds such as those made by, for example, the cooling fan 156 when operating. An increase in noise of the cooling fan 156 may not be as noticeable by the user if sounds from the A/V systems of the information handling system 100 are louder than the operation of the cooling fan 156.

In an embodiment, the operating characteristics of the information handling system 100 by the user includes the detection if, how many, and what peripheral devices are connected to the information handling system 100 either wirelessly or via a wired connection. Execution of drivers associated with these peripherals by the hardware processing resources (e.g., hardware processor 102) and operation of the wireless interface adapter 126 may increase the amount of heat produced within the housing of the information handling system 100. As described herein, the self-driving cooling system reinforcement learning agent 178 may be initiated based on metrics that include these operating characteristics of the information handling system by the user and these operational states of the information handling system. In an embodiment, the self-driving cooling system reinforcement learning agent 178 may provide output to the ion emitter/collector blower and fan control system 188 that executes control operations of the cooling fan 156 and ion emitter/collector blower 162.

As the operation of the self-driving cooling system reinforcement learning agent 178 continues, the reinforcement learning algorithm used by the self-driving cooling system reinforcement learning agent 178 increases in efficiency through the detection of positive metrics and negative metrics and feedback of those positive metrics and negative metrics back into the self-driving cooling system reinforcement learning agent 178 as input. In an example embodiment, the self-driving cooling system reinforcement learning agent 178 may be initially trained or operated prior to the self-driving cooling system reinforcement learning agent 178 being executed by the embedded controller 103 or other processing hardware in the information handling system 100. This prior training of the self-driving cooling system reinforcement learning agent 178 may include generic or basic policies developed through the reinforcement learning algorithm that would generically address, for a plurality of different types or units of information handling systems, temperature and noise increases within the information handling system 100. As the generically trained self-driving cooling system reinforcement learning agent 178 is executed at each specific information handling system 100 with its ion emitter/collector blower and fan control system 188, however, the self-driving cooling system reinforcement learning agent 178 may be further refined to accommodate those different operating characteristics of the information handling system by the user and operational states of the information handling system under which the user operates the information handling system 100. The generic policies executed by the self-driving cooling system reinforcement learning agent 178 may, therefore, be further customized for each specific information handling system 100 and each specific user and use scenarios of the information handling system 100.

During operation of the self-driving cooling system reinforcement learning agent 178 with its ion emitter/collector blower and fan control system 188, the policies determined by the self-driving cooling system reinforcement learning agent 178 to be the most beneficial for the operation of the information handling system 100 may be initiated. These include, without limitation, initiation of the ion emitter/collector blower 162, increasing or decreasing the airflow 174 produced by the ion emitter/collector blower 162, initiating the operation of the cooling fan 156, increasing or decreasing the speed of the cooling fan 156 (e.g., increasing or decreasing the velocity of airflow 174), and mitigation of ozone produced by the ion emitter/collector blower 162 via execution of the trained ozone estimation machine learning model 182 described herein.

Operation and control of the ion emitter/collector blower 162 and cooling fan 156 via the ion emitter/collector blower and fan control system 188 with the self-driving cooling system reinforcement learning agent 178 have been described above. The execution of code instructions of the trained ozone estimation machine learning model 182 of the intelligent ozone estimation and mitigation system 180 by a hardware processing device (e.g., hardware processor 102, an embedded controller, and the like) may also be initiated to provide detected ozone levels or estimated ozone levels produced by the ion emitter/collector blower 162 in embodiments herein. In an example where the space between the ion emitter 164 and ion collector 168 of the ion emitter/collector blower 162 includes atmospheric air, any number of types of gas molecules may be subjected to an ionization process as described herein. For example, where the gas includes oxygen (O), the ionization of oxygen may include stripping an electron from molecules and forcing the removal of a single electron or a plurality of electrons from the oxygen molecule or molecule. This may lead to a $O^+$ or $O^{2+}$ ion (e.g., cation) being created by the ion emitter 164 and ionic driving circuit 160 in an embodiment. It is appreciated as well, that this ionization process of oxygen may also cause ozone to be created. In this example embodiment, a single ionized oxygen molecule ($O_2$) may be attracted to and combine with an oxygen molecule ($O_2$) to form an ozone molecule ($O_3$). This ozone molecule has a slightly positive dipole moment causing the ozone molecule to be repelled from the ion emitter 164 and attracted to the ion collector 168. In an embodiment, the ozone molecules, along with the other ionized molecules, create the shearing force against the other molecules in the atmosphere between the ion emitter 164 and ion collector 168 thereby creating an airflow from the ion emitter 164 to the ion collector 168. In an embodiment, the ion collector 168 may be in the form of a thermal fin set that allows the airflow to pass through the ion collector 168 and out of the ion emitter/collector cooling system 154 and, further out of a housing of the information handling system 100 via, for example, and exhaust vent. In another embodiment, the airflow created by the ion emitter 164 and ion collector 168 may be passed to a fan 168 or other additional active cooling systems within the housing of the information handling system 100. Additionally, other passive cooling systems may be included and associated with the ion emitter 164 and ion collector 168 such as vapor chambers, heat pipes, and heat conductors.

As a result of the ion emitter 164 creating ozone within the housing of the information handling system 100 and using that ozone as an ion that creates a shear force on the other molecules in the atmosphere to create the airflow, some of this ozone may be accidentally expelled from the housing of the information handling system 100. The amount of ozone expelled may be estimated and mitigated via execution of the intelligent ozone estimation and mitigation system 180 described herein. The intelligent ozone estimation and mitigation system 180 may include a trained ozone estimation machine learning model 182 executable by the hardware processor 102 such as a central processing unit (CPU) and an ozone mitigation system 184. The execution of the trained ozone estimation machine learning model 182 by the hardware processor (e.g., processor 102, GPU 152, and embedded controller, and the like) may identify an ozone estimation value estimating the amount of ozone produced at the ion emitter/collector cooling system 154. The ozone mitigation system 184 causes a mitigation process to be conducted when the ozone estimation value estimating the amount of ozone produced at the ion emitter/collector blower 162 indicates that an ozone threshold limit has been reached. In an embodiment, the ozone threshold limit may be set to an ozone level that is approved by, for example, a governmental entity such as the Occupational Safety and Health Administration (OSHA) in the United States. Other ozone threshold limits may be set such as ozone levels at or below 0.1 ppm over an eight-hour time frame or 0.2 ppm within a four-hour time frame and the like. In an embodiment, the ozone threshold limit may be set at an ozone level below those described herein in order to prevent ozone levels reaching those potentially unacceptable levels.

In an embodiment, the trained ozone estimation machine learning model 182 may be trained prior to the user purchasing or receiving the information handling system 100. In an embodiment, the training of the trained ozone estimation machine learning model 182 may be completed via testing procedures conducted by the manufacturer and may be based on ozone detected by an ozone detector during these testing procedures. In an example embodiment, a plurality of static and non-static measurements are used to train an ozone estimation machine learning model remotely to get a trained ozone estimation machine learning model 182. In an example embodiment, a static variable that is used as input to train the trained ozone estimation machine learning model 182 includes a distance measurement between the ion emitter 164 and ion collector 168. As described herein, the ion emitter 164 generates charged ions that are attracted to the oppositely-charged ion collector 168. The distance between the ion emitter 164 and ion collector 168 not only define the strength of the electric field between the ion emitter 164 and ion collector 168, but may also define the speed at which the ions generated by the ion emitter 164 travel from the ion emitter 164 to the ion collector 168. Because of this distance, ozone created at the ion emitter 164 may travel faster across a shorter distance for example, and be expelled from the ion collector 168 quicker thereby increasing the amount of ozone at or near the user of the information handling system 100.

In an example embodiment, a static variable that is used as input to train the trained ozone estimation machine learning model 182 includes an orientation of the information handling system 100. In the example embodiments where the information handling system 100 is a laptop-type information handling system, the orientation may include a closed orientation, a laptop orientation, a tablet orientation, a dual tablet configuration, and a tent orientation. The closed orientation is an orientation where the display portion of the laptop-type information handling system 100 is closed onto the base portion of the information handling system 100. The tablet configuration is an orientation where the information handling system is in a tablet form or where the base portion of the information handling system is made to flip behind the display portion. In a dual tablet configuration, the information handling system 100 may be made of a base portion that includes a separate base chassis display device along with the display device of the display portion of the information handling system or a single foldable display that may span both chassis of a dual-display information handling system 100. In this dual tablet configuration, the base portion and display portion are laid open to reveal both display devices or an entire foldable display to the user. In a laptop configuration, the information handling system may have the base portion on a table or on the user's lap with the display portion upright and viewable to the user. In a tent configuration, the display portion may be viewable to the user with the base portion in an orientation to prop up the display portion on a table, for example. These orientations may affect the accumulation of ozone at or near the user and may vary from information handling system 100 to information handling system 100 based on the size and shape of the housings of the base portions and display portions of the information handling system 100.

In an example embodiment, a static variable that is used as input to train the trained ozone estimation machine learning model 182 includes an average distance from the user to an exhaust vent where ozone may be expelled from out of the housing of the information handling system 100. This distance, again, may vary depending on the size and shape of the housings of the information handling system 100 as well as placement (e.g., a side or a back edge) of the exhaust vent. The average distance may be an anticipated range where the user may sit in front of the information handling system 100 to view, for example, the video display device 142 of the display chassis.

In an example embodiment, a static variable that is used as input to train the trained ozone estimation machine learning model 182 includes the size of the ion emitter 164 and the size of the ion collector 168. As described herein, the ion emitter 164, when a high voltage source associated with the ionic driving circuit 160 is operatively coupled thereto, generate ions that include, among others, ozone. Any location, including sharp points, on the ion emitter 164 may be a source form which these ions can be created. The more surface area and sharp points on the ion emitter 164, the more ions are created resulting in the creation of more ozone during the ionization process described herein. Any combinations of these static variables may be used to train the trained ozone estimation machine learning model 182 described herein.

In an embodiment, non-static measurements may also be used to initially train the trained ozone estimation machine learning model 182 at, for example, the manufacturer of the information handling system 100. It is appreciated that these non-static measurements are used as input in the trained ozone estimation machine learning model 182 as well when the information handling system 100 is operated by the user. Data associated with these non-static measurements may be received using one or more of the sensors 164-1, 164-2, 164-3, 164-*n*, for example, described herein. In an example embodiment, non-static measurements that are used as input to train the trained ozone estimation machine learning model 182 includes data received from a power consumption sensor. Power consumption at the information handling system 100 may relate to the amount of heat generated by heat-generating hardware within the housing of the information handling system 100. This is because the amount of power used by, for example, the hardware processor 102 relates to the amount of heat produced by the hardware processor 102 and this similarly applies to other hardware operating within the information handling system 100.

In an example embodiment, non-static measurements that are used as input to train the trained ozone estimation machine learning model 182 includes an ion emitter 164 and ion collector 168 operating voltage obtained via an ion emitter 164 and ion collector 168 operating voltage sensor. As described herein, as the voltage difference between the ion emitter 164 and ion collector 168 creates a larger electric field between them as well as initiate the creation of ions on a relatively more rapid pace. Again, as the generation of ions at the ion emitter 164 increases, the instances of the creation of ozone also increases.

In an example embodiment, a non-static measurement that is used as input to train the trained ozone estimation machine learning model 182 includes data obtained from one or more temperature sensors placed at various locations within the information handling system 100 to monitor for temperatures within the housing of the information handling system 100. This includes temperature sensors at the heat-generating devices for which the ion emitter/collector cooling system 154 with its fan 168 and ion emitter 164/ion collector 168 are used to cool those devices. Again, an increase in heat may be indicative of an increase in power usage which results in an increase in the voltage applied to the ion emitter 164 and ion collector 168 to create the airflow used to cool these hardware devices as described herein.

In an example embodiment, a non-static measurement that is used as input to train the trained ozone estimation machine learning model 182 includes data obtained from one or more humidity sensors. In some embodiments, higher temperatures such as those detected within a housing of the information handling system 100 are generally associated with higher ozone levels while higher relative humidity are generally associated with lower ozone levels. In this example embodiment, current temperature and the humidity levels (e.g., within the housing or outside of the housing of the information handling system 100) may affect the levels of ozone production and presence.

With the operating characteristics of the information handling system by the user and the operational states of the information handling system being identified as described herein, the operation and execution by an embedded controller of the self-driving cooling system reinforcement learning agent 178 may begin when the user initially powers up the information handling system 100. Because certain general policies have been provided to the intelligent ozone estimation and mitigation system 180, the execution of the intelligent ozone estimation and mitigation system 180 may begin with initiating and controlling (e.g., increasing airflow through the ion emitter/collector blower 162 and/or cooling fan 156) the ion emitter/collector blower 162 and/or cooling fan 156 based on those initial and general policies. The policies are also affected by real-time data received from, for example, a plurality of sensors 186-1, 186-2, 186-3, 186-$n$ that are associated with the ozone mitigation system 184 and the self-driving cooling system reinforcement learning agent 178. These sensors, in an embodiment, may include temperature sensors such as thermistors 186-1 that detect a current temperature within the housing of the information handling system 100 and/or the temperature of individual hardware devices such as the hardware processor 102 among the plurality of sensors 186-1, 186-2, 186-3, 186-$n$. Other sensors among the plurality of sensors 186-1, 186-2, 186-3, 186-$n$ may include telemetry sensors that are both within the housing of the information handling system 100 and located at one or more access points 136 and base stations 138. The telemetry sensors may provide data to the embedded controller to determine the location of the information handling system (e.g., inside, outside, near a base station 138, near an access point 136, etc.). Other metrics described herein are also provided to the embedded controller or other hardware processor executing the self-driving cooling system reinforcement learning agent 178 to provide data for implementation of the general policies described herein.

Based on the general policies, the embedded controller 103 or other processing hardware may execute instructions of the self-driving cooling system reinforcement learning agent 178 of the ion emitter/collector blower and fan control system 188 to initiate, activate, and control the operations of the ion emitter/collector blower 162 and cooling fan 156 in order to accomplish certain criteria such as meeting the operating characteristics of the information handling system by the user and operational states of the information handling system. For example, where the user has selected a quiet mode, the activation and control of the ion emitter/collector blower 162 is prioritized over the activation and control of the cooling fan 156. That is, the ion emitter/collector blower 162, being relatively more silent than the cooling fan 156, is activated to cool the hardware devices within the housing of the information handling system 100 for as much time as it is capable. Where temperatures increase, the operation of the ion emitter/collector blower 162 may also be increased by applying more voltage to the ion emitter 164 to create relatively more ions that produce more airflow through the ion emitter/collector blower 162. It is only when, in an example embodiment, that the detected temperatures by the thermistors exceed the cooling capabilities of the ion emitter/collector blower 162 that the self-driving cooling system reinforcement learning agent 178 initiates and controls the operation of the cooling fan 156 in order to provide additional airflow throughout the housing of the information handling system 100.

Therefore, in an embodiment, the cooling fan 156 may be prevented from rotating by the execution of policies of the ion emitter/collector blower and fan control system 188 and the self-driving cooling system reinforcement learning agent 178 unless a threshold temperature has been reached. However, the self-driving cooling system reinforcement learning agent 178 manages all operating characteristics of the information handling system by the user and operational states of the information handling system in part in order to execute certain instructions and certain actions taken by the ion emitter/collector blower and fan control system 188 may result in positive outcomes or negative outcomes. In an example embodiment, a positive outcome from an action taken by the ion emitter/collector blower and fan control system 188 and the self-driving cooling system reinforcement learning agent 178 may include a drop or maintaining of temperature within the housing of the information handling system 100, a decrease in power consumption, a decrease in ozone levels, a decrease in noise produced by the cooling fan 156, and the like. In an example embodiment, a negative outcome from an action taken by the ion emitter/collector blower and fan control system 188 and the self-driving cooling system reinforcement learning agent 178 may include an increase in temperature within the housing of the information handling system 100, an increase in power consumption, a decrease in ozone levels, an increase in noise produced by the cooling fan 156, and the like.

In an embodiment, the positive and negative metrics (e.g., outcomes from actions taken by the ion emitter/collector blower and fan control system 188 and the self-driving cooling system reinforcement learning agent 178) may be associated with weights. These weights may be associated with each of the positive metrics based on how an outcome from an action such as by the intelligent ozone estimation and mitigation system 180, for example, reduced the temperature, decreased power consumption, reduced ozone levels, decreased noise levels and how well those actions cause the operation of the information handling system 100 to remain within parameters indicated by the operating characteristics of the information handling system by the user (e.g., met standards of a performance mode, quiet mode, and/or power mode). These weights may be associated with each of a plurality of negative metrics based on how the action recommended by the intelligent ozone estimation and mitigation system 180 or self-driving cooling system reinforcement learning agent 178, for example, increased the temperature, increased power consumption, increased ozone levels, increased noise levels and how well those actions cause the operation of the information handling system 100 to fall outside of parameters indicated by the operating characteristics of the information handling system by the user (e.g., met standards of a performance mode, quiet mode, and/or power mode). Similarly, weights may be associated with each of a plurality of positive metrics based on how a recommended action by the self-driving cooling system reinforcement learning agent 178 causes the operation of the information handling system 100 to fall within parameters indicated by the operating characteristics of the information handling system by the user (e.g., met standards of a performance mode, quiet mode, and/or power mode)

The information handling system 100 can include one or more sets of machine-readable code instructions 110 that can be executed to cause the computer system to perform any one or more of the methods or computer-based functions disclosed herein. For example, machine-readable code instructions 110 may execute; via hardware processing resources, various software applications, software agents, a basic input/output system (BIOS) 112 firmware and/or software, or other aspects or components. Machine-readable code instructions 110 may execute, via an embedded controller 102, the self-driving cooling system reinforcement learning agent 178 which is a control system for operating an ion emitter/collector blower 162 and cooling fan 156 to control temperatures within the information handling system 100 of the embodiments herein. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of machine-readable code instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of machine-readable code instructions, parameters, or profiles 110 described herein. The disk drive unit 118 or static memory 106 also contain space for data storage. Further, the machine-readable code instructions 110 may embody one or more of the methods as described herein. In a particular embodiment, the machine-readable code instructions, parameters, and profiles 110 may reside completely, or at least partially, within the main memory 104, the static memory 106, and/or within the disk drive 118 during execution by the hardware processor 102, EC 103, or GPU 152 of information handling system 100. The main memory 104, GPU 152, EC 103, and the hardware processor 102 also may include associated computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may include a hardware controller and executable machine-readable code instructions to manage the power provided to the components of the information handling system 100 such as the hardware processor 102, and manage control of the cooling fan 156, ion emitter 164, ion collector 168, ionic driving circuit 172, and other hardware components described herein. The PMU 120 may control power to one or more components including the one or more drive units 118, the hardware processor 102 (e.g., CPU), the EC 103, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels or temperature via thermistors and be electrically coupled, either wired or wirelessly, to the information handling system 100 to provide this power and coupled to bus 116 to provide or receive data or machine-readable code instructions. The PMU 120 may regulate power from a power source such as a battery 122 or AC power adapter 124 to various components including fan motor 158 or the ion emitter/collector blower 162. In an embodiment, the battery 122 may be charged via the AC power adapter 124 and provide power to the components of the information handling system 100 via a wired connections as applicable, or when AC power from the AC power adapter 124 is removed. PMU 120 may include a hardware controller to operate with the EC 103 separately or together to execute machine-readable code instructions 110 of an ion emitter/collector blower and fan control system 188 to control the ion emitter/collector blower and fan cooling system 154 with the cooling fan 156 and ion emitter/collector blower 162 based on detected temperature thresholds and recommendations of a self-driving cooling system reinforcement learning agent 178 according to embodiments of the present disclosure.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® Core class processor, ARM® brand processors, Qualcomm® Snapdragon processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2A:
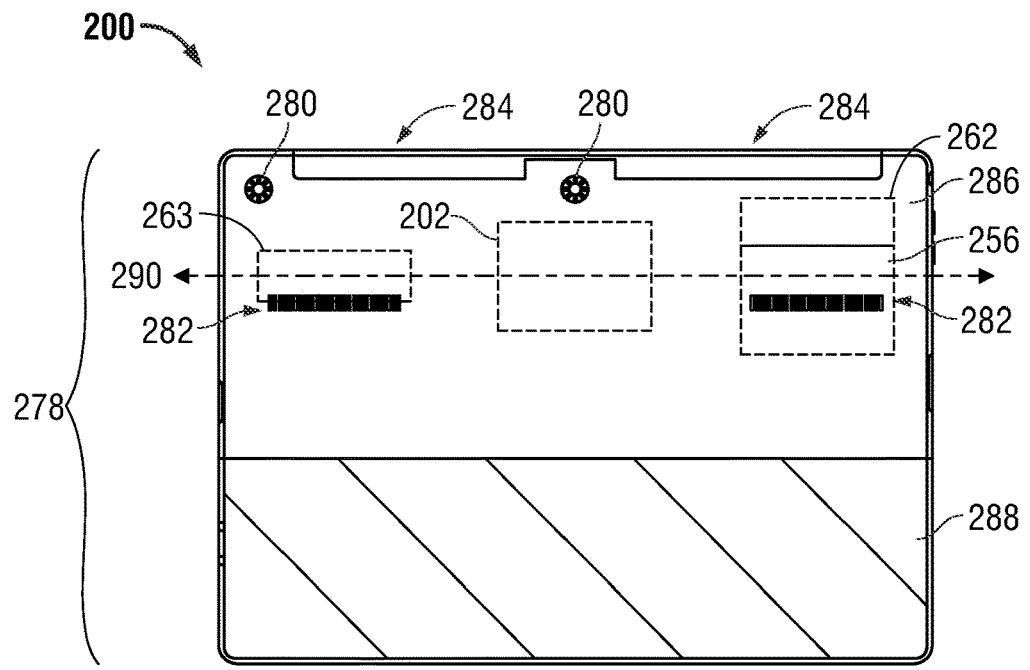
FIG. 2A is a graphic diagram rear view of an information handling system housing a cooling fan and an ion emitter/collector blower in series according to an embodiment of the present disclosure.
Figure 2B:
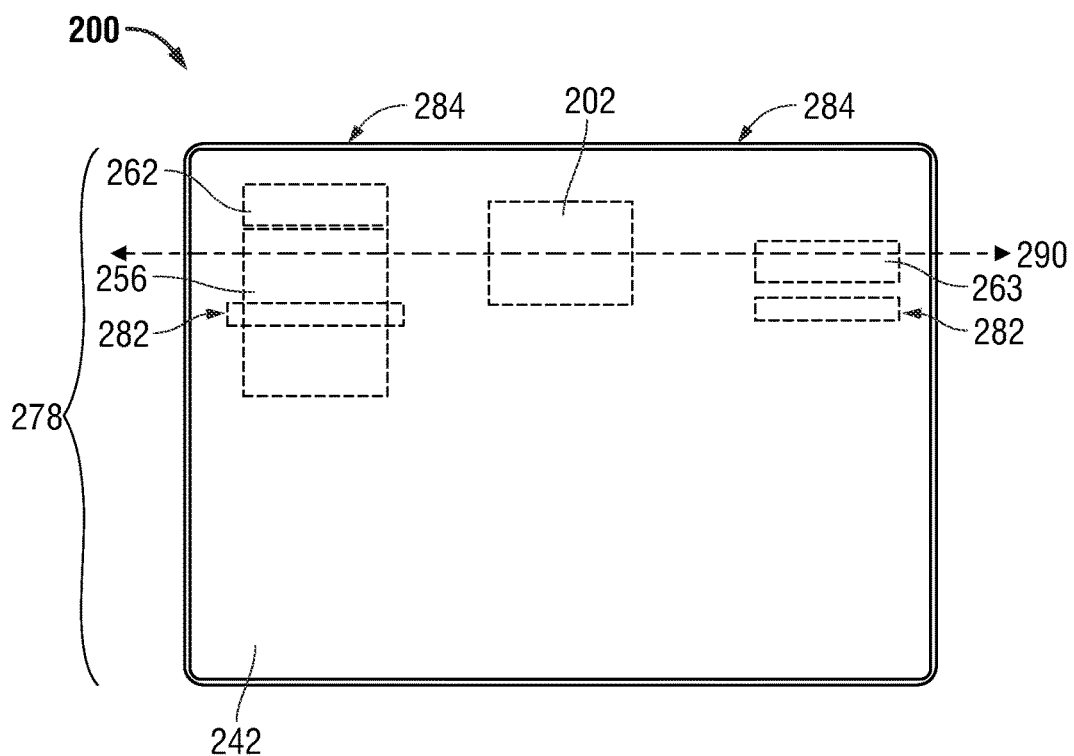
FIG. 2B is a graphic diagram top view of an information handling system housing a cooling fan and an ion emitter/collector blower in series according to another embodiment of the present disclosure.

FIG. 2A is a graphic diagram bottom view of an information handling system 200 housing a fan at a fan location 256 and an ion emitter/collector blower at an ion emitter/collector blower location 262 in series according to an embodiment of the present disclosure. Additionally, FIG. 2B is a graphic diagram top view of an information handling system 200 housing a fan at a fan location 256 and an ion emitter/collector blower at an ion emitter/collector blower location 262 in series according to another embodiment of the present disclosure. The information handling system 200, as shown in FIGS. 2A and 2B, may be one of a tablet information handling system or a two-in-one information handling system or other type of mobile information handling system that may operate in a vertical, near vertical, or otherwise upright orientation in some embodiments. Although the present specification describes the information handling system 200 as being a tablet-type information handling system, the present specification contemplates that the ion emitter/collector blower and fan cooling system described herein can be housed within any type of information handling system. Additionally, the information handling system 200 described herein includes a self-driving cooling system reinforcement learning agent executed by a processing device (e.g., embedded controller, hardware processor, GPU, and the like) as described herein. The execution of the self-driving cooling system reinforcement learning agent allows for the customization of policies used by the self-driving cooling system reinforcement learning agent to perform actions to reduce the temperature within the housing of the information handling system 200 and mitigate ozone produced by the ion emitter/collector blower.

As described herein, the information handling system 200 may include a wireless or detachable keyboard (not shown) used by the user to provide input to the information handling system 200. In an embodiment, the video display device 242 of the information handling system 200 may be a touch display device that also or alternatively allows the user to provide input to and receive output from the information handling system 200. As described herein, the video display device 242 may serve as a cover or chassis used as a cover for the hardware devices within the display chassis 278.

In an embodiment, the information handling system 200 may include a display chassis 278 that includes the back cover 286 and the video display device 242 acting as a front cover. The back cover 286 and video display device 242 may be used to house a processor at the processor location 202 as well as ion emitter/collector blowers at ion emitter/collector blower locations 282 and one or more fans at a fan location 256. Other hardware components such as a battery (not shown), a memory device (not shown), a PMU (not shown) are also housed within the display chassis 278. The front cover/video display device 242, as described herein, includes a front cover/video display device 242 that serves both to cover this hardware as well as an input and output device via the touch screen video display device as described herein. The back cover 286 may also house one or more cameras 280 or other imaging device used by a user to capture still images or videos.

As described herein, the ion emitter/collector blower and fan cooling system may include one or more air intake vents 282 formed vertically at or below the fan at the fan location 256. These air intake vent 282 may allow air to be drawn into the display chassis 278 via controlled activation of the ion emitter/collector blower as well as a cooling fan that may generate a cooling airflow within the information handling system. Air may be blown out of the display chassis 278 at one or more air exhaust vents 284 having an upper exhaust vent location in the vertically oriented information handling system 200 thereby cooling the air and heat-generating components (e.g., the hardware processor) within the display chassis 278.

As shown in FIGS. 2A and 2B, the ion emitter/collector blower and fan cooling system has an ion emitter/collector blower location 262 that is above the air intake vents 282 when information handling system 200 is in an upright orientation. In an embodiment, the fan location 256 and ion emitter/collector blower location 262 may straddle a hardware processor centerline 290 of the hardware processor at the hardware processor location 202 placing the ion emitter/collector blower location 262 vertically higher than the hardware processor centerline 290 and a majority of the fan location 256 below the hardware processor centerline 290.

In the present specification, the term "vertical" is meant as an upward location where the top of the information handling system 200 is where the air exhaust vents 284 are formed into the housing when the information handling system 200 is in a vertical, near vertical, or otherwise upright orientation for discussion purposes. Therefore, in FIGS. 2A and 2B, the hardware processor centerline 290 is closer, vertically, to the air exhaust vents 284 while the fan is located at or below the hardware processor centerline 290. In the embodiment shown in FIGS. 2A and 2B, the ion emitter/collector blower and fan cooling system includes a fan at a fan location 256 in series with an ion emitter/collector blower at an ion emitter/collector blower location 262 on a left side of the information handling system 200. At the right side of the information handling system 200, the example information handling system 200 includes a single ion emitter/collector blower at an ion emitter/collector blower location 263. In an example embodiment, the information handling system 200 may include any number of ion emitter/collector blowers or fans. It is appreciated that, although the present specification describes a certain number of fans at a fan location 256 in series with a certain number of ion emitter/collector blowers at ion emitter/collector blower locations 262 or 263, more or fewer fans and ion emitter/collector blowers may be used to exhaust heated air from within the housing of the information handling system 200. Further it is contemplated that "vertical" and the top of the information handling system 200 and location of vents 282 and 284 may be on any side of chassis 278 in various embodiments.

The air intake vents 282, in an embodiment, are placed, vertically, lower than the ion emitter/collector blower locations 262 and placed at or behind the fan location 256. The placement of the hardware processor at the fan location 256 and ion emitter/collector blower location 262 allows for the operation of the fan and ion emitter/collector blower to take advantage of a chimney effect and remove air heated around the hardware processor in some embodiments. The chimney effect, in one embodiment of the present specification, pulls air into the housing of the information handling system via the air intake vent 282, through both the fan and ion emitter/collector blower, and out of the housing via the air exhaust vents 284 due to the differences in air buoyancy between the air inside the housing of the information handling system 200 and the air outside of the information handling system 200. This may occur without the activation of the ion emitter/collector blower or the fan. When the air within the housing of the information handling system 200 is heated due to the operation of the heat-generating hardware components, cool air is pulled into the housing and accelerated through the housing via operation of the ion emitter/collector blower and fan cooling system generating the airflow which may be further enhanced based on the chimney effect. This increases the amount of cold air drawn into and heated air passed out of the housing of the information handling system 200.

As shown in FIG. 2A, the bottom or back cover 286 may include a kickstand 288 formed thereon. This kickstand 288 may allow the user to prop up the information handling system 200 on a flat surface or a lap in order to interact with the information handling system 200. The kickstand 288 can be moved to a closed orientation for the user to interact with the information handling system 200 as a tablet configuration, for example a hand-held tablet. Still further, in an embodiment where the kickstand 288 has been deployed, the user may operatively couple a detachable keyboard to the bottom edge of the information handling system 200 allowing the user to provide input to the information handling system 200.

During operation, the airflow created by the ion emitter/collector blower may be supplemented by an airflow generated by the operation of a fan. In an embodiment, the fan is placed upstream or at an air intake location 282 of the ion emitter/collector blower so that air may pass through a housing of the fan, enter the ion emitter/collector blower, and be accelerated through the housing of the ion emitter/collector blower and out of the ion emitter/collector blower at exhaust vent location 284. This series arrangement of the fan to the ion emitter/collector blower allows for the selective activation of the fan, the ion emitter/collector blower, or both based on, for example, a temperature detected within the chassis of the information handling system 200, specific hardware devices within the housing, or a combination of hardware devices within the housing of the information handling system 200. Additionally, or alternatively, the power consumed by one or more hardware devices within the information handling system 200 may indicate if and when the fan, the ion emitter/collector blower, or both are activated to create an airflow through the housing of the information handling system 200.

As described herein, the self-driving cooling system reinforcement learning agent may be executed by a hardware processing device on the information handling system 200. In an embodiment, a generically trained self-driving cooling system reinforcement learning agent may be initially uploaded onto a memory device on the information handling system 200 by the manufacturer. The generic training of the self-driving cooling system reinforcement learning agent may include policies that initiate actions by the ion emitter/collector blower and fan control system in order to reduce the temperature within the housing of the information handling system 200 as well as mitigate noise produced by the cooling fan (e.g., when activated) and mitigate ozone produced by the operation of the ion emitter/collector blower described herein. As described herein, these initial and generic policies are updated through the operation of the reinforcement learning algorithm by the self-driving cooling system reinforcement learning agent on the ion emitter/collector blower and fan control system operates to control the ion emitter/collector blower and the fan. In an embodiment, the self-driving cooling system reinforcement learning agent may monitor for positive metrics and negative metrics as described herein. In an embodiment, the extent of the positive outcome associated with the positive metrics may indicate a weight to be associated with the positive outcomes for factors input into the self-driving cooling system reinforcement learning agent. Additionally, in an embodiment, the extent of the negative outcome associated with the negative metrics may indicate a weight to be associated with the negative outcomes. A summation of all weighted negative metrics may be subtracted from a summation of all weighted positive outcomes in order to arrive at a "total reward" metric.

This total reward metric may be used as further input to the self-driving cooling system reinforcement learning agent and, specifically, used by the reinforcement learning algorithm to customize those policies used by the self-driving cooling system reinforcement learning agent in order to adjust the actions initiated by the ion emitter/collector blower and fan control system. During this process, the self-driving cooling system reinforcement learning agent receives all observed states of the information handling system 200 such as temperature and telemetry data and determines whether the total reward metric is improving the observed states of the information handling system 200 including a reduction or leveling of the temperature within the housing of the information handling system 200 and/or reduction or leveling of the ozone produced by the ion emitter/collector blower.

Therefore, as the user uses the information handling system, the self-driving cooling system reinforcement learning agent increases effectiveness of recommendation of how best to mitigate temperature increases and ozone increases under a variety of circumstances with the ion emitter/collector or the fan. As described herein, these circumstances include those operating characteristics of the information handling system by the user and the operational states of the information handling system. For example, where the user is operating the information handling system 200 under a performance mode using a DC power source, the remedial actions by the self-driving cooling system reinforcement learning agent may differ from those actions by the self-driving cooling system reinforcement learning agent when, for example, the user is operating the information handling system 200 under a quiet mode and using an AC power source. As the self-driving cooling system reinforcement learning agent detects these operating characteristics of the information handling system by the user and operational states of the information handling system, it adjusts the actions taken based on past metrics (e.g., negative and positive metrics) thereby adjusting the operations of the ion emitter/collector blower and cooling fan to accommodate for these different use cases.

Figure 3:
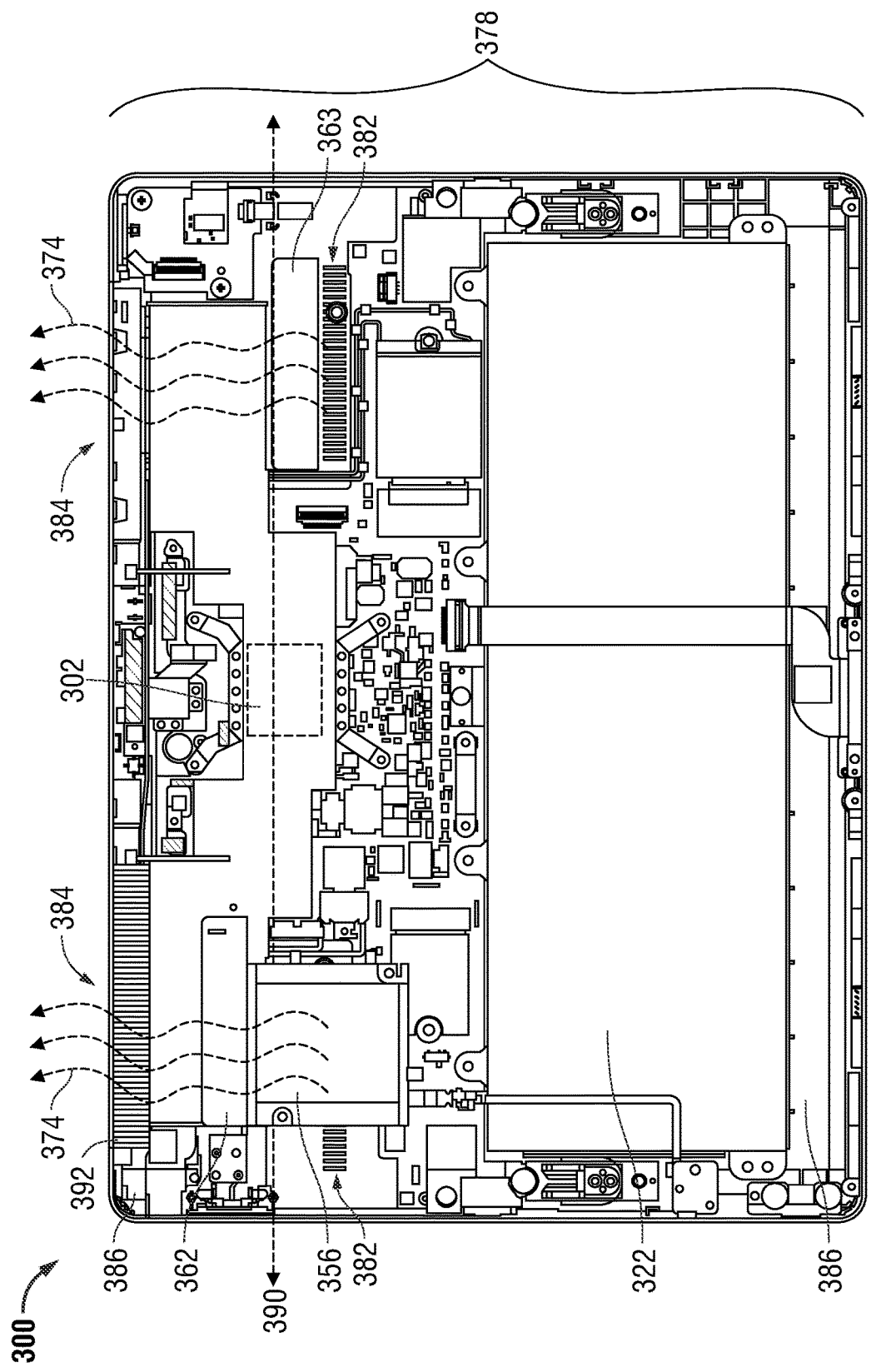
FIG. 3 is a graphic diagram top view of an interior of an information handling system including the ion emitter/collector blower and a cooling fan in series according to another embodiment of the present disclosure.

FIG. 3 is a graphic diagram top or front view of an interior of an information handling system 300 including the ion emitter/collector blower 362 and a cooling fan 356 in series according to another embodiment of the present disclosure. The information handling system 300 shown in FIG. 3 may be similar to the information handling system shown in FIG. 2B with the front cover or display (e.g., FIG. 2B, 242) removed allowing for the hardware components therein to be shown. Again, the orientation of the information handling system chassis 300 shows a tablet-type or two-in-one information handling system 300 in a vertical or upright orientation with a top of the information handling system 300 being closest to the top of the image and the bottom of the information handling system 300 being closest to the bottom of the image of FIG. 3. Again, the information handling system 300 described herein includes a self-driving cooling system reinforcement learning agent and ion emitter/collector blower and fan control system executed by a processing device (e.g., embedded controller, hardware processor, GPU, and the like) as described herein. The execution of the self-driving cooling system reinforcement learning agent allows for the customization of policies used by the ion emitter/collector blower and fan control system to perform actions to reduce the temperature within the housing of the information handling system 300 and mitigate ozone produced by the ion emitter/collector blower.

As described herein, the information handling system 300 may include a wireless or detachable keyboard (not shown) used by the user to provide input to the information handling system 300. In an embodiment, this keyboard may be operatively and mechanically couplable to a side wall (e.g., bottom wall) of the tablet-type information handling system 300.

In embodiments herein, the tablet-type or two-in-one information handling system 300 may include a display chassis 378 that includes the back cover 386 and front cover/display (not shown). The back cover 386 and front cover/display may be used to house a hardware processor at the hardware processor location 302 as well as one or more ion emitter/collector blower cooling systems 362 and 363 that are placed to straddle a hardware processor centerline 390 or may be placed elsewhere in the tablet-type information handling system 300 when in a vertical, near-vertical, or otherwise upright orientation. Other hardware components such as a battery 322, a memory device (not shown), a PMU (not shown) are also housed within the display chassis 378 of the tablet-type or two-in-one information handling system 300 in a vertical orientation. The front cover/display (not shown), as described herein, includes a front cover/display that serves both to cover this hardware as well as an input device such as the touch screen video display device as described herein. The back cover 386 may also house a camera (not shown) or other imaging device used by a user to capture still images or videos.

As described herein, the ion emitter/collector blower cooling system may include one or more air intake vents 382 formed at or behind the cooling fan 356 or at ion emitter/collector blower 363. FIG. 3 shows a single cooling fan 356 placed in series with a single ion emitter/collector blower 362 on the left as well as a single ion emitter/collector blower 363 on the right in an embodiment. However, it is appreciated that any number of fans 356 may be placed, in series, with any number of ion emitter/collector blowers 362 in other embodiments. The air intake vents 382 may allow air to be drawn into the display chassis 378 via the cooling fan 356, passed through the cooling fan 356 (e.g., when fan is either activated or not) and into the ion emitter/collector blower 362 in series with the cooling fan 356 or into the chassis 378 at ion emitter/collector blower 363, and out of the air exhaust vents 384 formed at the top side wall of the back cover 386 of the display chassis 378. In one embodiment, the output vent of the cooling fan 356 may be sealed against the input vent of the ion emitter/collector blower 362 so that air passing from the housing of the cooling fan 356 may pass directly into the air intake of the ion emitter/collector blower 362. In an embodiment, the housing at the air output of the cooling fan 356 may be similarly sized to the air intake of the ion emitter/collector blower 362.

As shown in FIG. 3, the cooling fan 356 and ion emitter/collector blower 362 straddle a hardware processor centerline 390 or a centerline of another heat generating hardware component or passive cooling device. The hardware processor centerline 390 is closer, vertically, to the air exhaust vents 384 while the cooling fan 356 is located generally below the hardware processor centerline 390 since the hardware processor is typically a substantial heat producing hardware component. Still further, the air intake vent 382 is behind (e.g., in a z-direction or into the page) the cooling fan 356. The placement of the hardware processor at the hardware processor location 302 generally above cooling fan 356 allows for the operation of the cooling fan 356 and ion emitter/collector blower 362 to take advantage of a chimney effect in some embodiments to clear air heated around the location or area of the hardware processor and other heat-generating devices within the display chassis 378. The chimney effect, in the present specification, pulls air into the housing of the information handling system via the air intake vents 382 and out of the housing via the air exhaust vents 384 due to the differences in air buoyancy between the air inside the housing of the information handling system 300 and the air outside of the information handling system 300. This chimney effect may even generate some airflow even with the ion emitter/collector blowers 362, 363 or cooling fan 356 idle. With the movement of air by the cooling fan 356 and/or the ion emitter/collector blower 362, 363 this increases the amount of cold air drawn into and heated air passed out of the housing of the information handling system 300.

As described herein, each of the ion emitter/collector blowers 362 or 363 include an ion emitter and ion collector. In an embodiment, the ion emitters include a plurality of emitter blades through which air may pass (e.g., from a fan or in from an inlet vent 382) and which are used to create an airflow 374 into, through, and out of the ion emitter/collector blower 362, 363. The number of blades may vary depending on an anticipated level of heat generation by the hardware components within the information handling system 300, and the shape and design of the housing of the ion emitter/collector blower 362 or 363, the shape and design of the housing chassis 378 of the cooling fan 356, or housing of the information handling system 300, among other factors. Each of the emitter blades are coupled to an electrode of a high voltage source of an ionic driving circuit (not shown). In an embodiment, each of the emitter blades includes a blade edge. In one embodiment, the blade edges may be made to come to a sharp point in order to facilitate the creation of more ions. In an embodiment, the ion emitters and the emitter blades may be made of a refractory metal such as niobium, chromium, molybdenum, tantalum, tungsten, and rhenium among others. In an embodiment, the portions of the ion emitter/collector blower 362 or 363 and emitter blades may be electroplated with a refractory metal such as niobium, chromium, molybdenum, tantalum, tungsten, and rhenium among others with an interior layer of the first ion emitter and emitter blades being made of a conductive material such as iron. It is appreciated that the emitter blades may be made of any alloy of metal that includes alloys of those refractory metals described herein.

The ion emitter/collector blowers 362 or 363 also include an ion collector. In an embodiment, the ion collector includes a plurality of collector blades through which air may pass and which are used to deionize those ions created at the ion emitters as described herein. The number of collector blades may vary depending on an anticipated level of heat generation by the hardware components within the information handling system 300, the shape and design of the housing chassis 378 of the information handling system 300 or the shape and design of the housing of the ion emitter/collector blower 362 or 363, among other factors such as the creation of ions at the first ion emitters. Each of the collector blades are coupled to an electrode of a high voltage source of an ionic driving circuit in an embodiment. In an embodiment, the collector blades are coupled to a grounding source used to prevent arcing between the ion emitter/collector blower 362, 363. In an embodiment, each of the collector blades includes a blade edge. It is appreciated that the ion collector blades may be made of any alloy of metal that includes alloys of those refractory metals described herein.

The back cover 386 may include a kickstand (not shown) formed thereon. This kickstand may allow the user to prop up the tablet-type information handling system 300 in a vertical or near-vertical orientation on a flat surface or a lap in order to interact with the information handling system 300. The kickstand can be moved to a closed orientation for the user to interact with the information handling system 300 as a hand-held tablet configuration. Still further, in an embodiment where the kickstand has been deployed, the user may operatively couple a detachable keyboard to the bottom edge or sidewall of the information handling system 300 allowing the user to provide input to the information handling system 300. In such a laptop configuration, the air behind the information handling system 300 may be drawn into the display chassis 378, pass through the cooling fan 356 and ion emitter/collector blower 362 placed in series or a single ion emitter/collector blower 363, and out of the air exhaust vent 380 with convection-enhanced airflow 374. It is appreciated that the space or distance between the ion emitter/collector blower 362, 363 and the air exhaust vents 384 may include any type of passive heat conducting device such as a fin-stack 392. In an embodiment, the fin-stack 392 may be operatively coupled to other heat conducting devices such as heat pipes or vapor chambers used to conduct heat from the hardware processor or other heat-generating devices to the fin-stack 392. Because the fin-stack 392 is in the path of the airflow 374, heat conducted into the fin-stack 392 may be dissipated into the airflow 374 via convection and passed out of the display chassis 378.

In one embodiment, a sealed channel may be formed between the ion emitter/collector blower 362 or 363 and the air exhaust vents 384 that seal the hardware processor at the hardware processor location 302 or passive heat conducting devices thermally coupled thereto into the airflow 374 path. In an embodiment, the sealed channel area may be fluidically sealed portion of the display chassis 378 or maybe an additional sealing channel structure around the hardware processor, other heat-generating hardware devices, or passive cooling structures within the housing of the information handling system 300. This may focus air from the cooling fan 356 and the ion emitter/collector blower 362 to the heat generating hardware devices or passive cooling structures. For example, this sealed channel area allows heated air to be placed into the airflow between the ion emitter/collector blower 362 and fin-stack 392 and pushed out of the housing of the information handling system 300. In an embodiment, the sealed channel location may house any number of passive heat conducting devices that draw heat away from the heat-generating devices and into an airflow 374 between the ion emitter/collector blower 362 and air exhaust vent 384 acting as a fluid-to-fluid heat exchanger transferring thermal energy from the passive heat conducting devices (e.g., heatpipe, vapor chamber, fin-stack, etc.) to the air within the airflow 374.

As described herein, the self-driving cooling system reinforcement learning agent and ion emitter/collector blower and fan control system may be executed by a hardware processing device on the information handling system 300. In an embodiment, a generically trained self-driving cooling system reinforcement learning agent may be initially uploaded onto a memory device on the information handling system 300 by the manufacturer. The generic training of the self-driving cooling system reinforcement learning agent may include policies that initiate actions by the ion emitter/collector blower and fan control system in order to reduce the temperature within the housing of the information handling system 300 as well as mitigate noise produced by the cooling fan (e.g., when activated) and mitigate ozone produced by the operation of the ion emitter/collector blower when operating as described herein. As described herein, these initial and generic policies are updated through the operation of the ion emitter/collector blower and fan control system by the self-driving cooling system reinforcement learning agent. In an embodiment, the self-driving cooling system reinforcement learning agent may monitor for positive metrics and negative metrics as described herein. In an embodiment, the extent of the positive outcome associated with the positive metrics may indicate a weight to be associated with the positive outcomes. Additionally, in an embodiment, the extent of the negative outcome associated with the negative metrics may indicate a weight to be associated with the negative outcomes. A summation of all weighted negative metrics may be subtracted from a summation of all weighted positive outcomes in order to arrive at a "total reward" metric for feedback and use by the self-driving reinforcement learning agent.

This total reward metric may be used as input to the self-driving cooling system reinforcement learning agent and, specifically, and by the reinforcement learning algorithm to customize those policies used with the ion emitter/collector blower and fan control system in order to adjust the actions initiated by the ion emitter/collector blower and fan control system to control the ion emitter/collector and the cooling fan. During this process, the self-driving cooling system reinforcement learning agent receives all observed states of the information handling system 300 such as temperature and telemetry data and determines whether the total reward metric is improving the observed states of the information handling system 300 including a reduction or leveling of the temperature within the housing of the information handling system 300 and/or reduction or leveling of the ozone produced by the ion emitter/collector blower.

Therefore, as the user uses the information handling system, the self-driving cooling system reinforcement learning agent improves the effectiveness of its recommendations of how best to mitigate temperature increases and ozone increases under a variety of circumstances and when to control cooling system noise. As described herein, these circumstances include those operating characteristics of the information handling system by the user and the operational states of the information handling system. For example, where the user is operating the information handling system 300 under a performance mode using a DC power source, the redial actions by the self-driving cooling system reinforcement learning agent may differ from those actions by the self-driving cooling system reinforcement learning agent when, for example, the user is operating the information handling system 200 under a quiet mode and using an AC power source. As the self-driving cooling system reinforcement learning agent detects these operating characteristics of the information handling system by the user and operational states of the information handling system, it adjusts the actions taken based on past metrics (e.g., negative and positive metrics) thereby adjusting the operations of the ion emitter/collector blower and cooling fan to accommodate for these different use cases.

Figure 4:
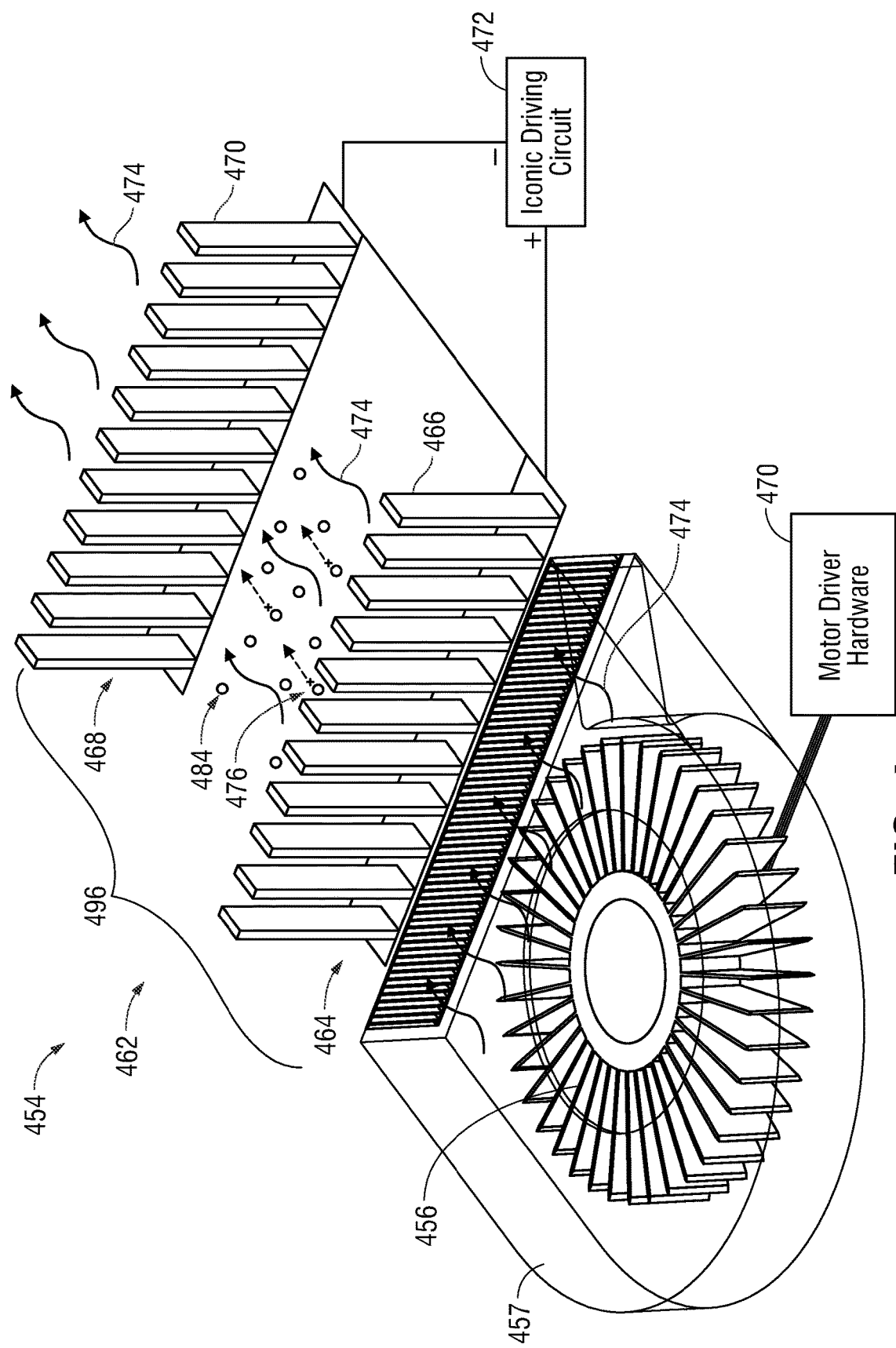
FIG. 4 is a graphic diagram perspective view of an ion emitter/collector blower including an ion emitter and ion collector as well as a fan housing used to house a cooling fan according to another embodiment of the present disclosure.

FIG. 4 is a graphic diagram perspective view of an ion emitter/collector blower and fan cooling system 454 including an ion emitter/collector blower 462 that comprises an ion emitter 464 and ion collector 468 as well as a fan housing 457 used to house a fan 456 according to another embodiment of the present disclosure. The ion emitter/collector blower 462 may be coupled within a chassis of the information handling system in an embodiment so that heat generated by the operation of the hardware (e.g., hardware processor, memory devices, PMU, CPU, etc.) may be directed out of the information handling system via an air exhaust vent formed in the chassis (e.g., at a top side surface of the base chassis of the information handling system). As described herein, the arrangement of the ion emitter/collector blower 462 relative to the fan housing 457 and fan is shown in FIG. 4 with the fan impeller within the fan housing 457 to show a relative position over an air intake vent (not shown). As such, the ion emitter/collector blower 462 may be placed in series with the fan and fan housing 457 so that the velocity of the airflow 474 may be increased as it passes through the fan housing 457 and the ion emitter/collector blower 462. The ion emitter/collector blower 462 may include an ion emitter/collector blower housing (not shown) used to house the components of the ion emitter/collector blower 462 described herein in an embodiment. However, FIG. 4 does not show the housing of the ion emitter/collector blower 462 so that the ion emitter 464 and ion collector 468 may be seen. In an alternative embodiment, the ion emitter/collector blower 462 does not include an ion emitter/collector blower housing and instead, those components of the ion emitter/collector blower are operatively coupled to the chassis of the information handling system. Again, as described herein, the fan housing 457 may be fluidically sealed to an air intake of the ion emitter/collector blower 462 in those embodiments where the ion emitter/collector blower and cooling fan are placed in series.

The ion emitter/collector blower and fan cooling system 454 includes the ion emitter/collector blower 462 with an ion emitter 464. In an embodiment, the ion emitter 464 includes a plurality of ion emitter blades 466 through which air may pass and which are used to create an airflow into, through, and out of the ion emitter/collector blower housing. The number of ion emitter blades 466 may vary in number, size, or shape depending on an anticipated level of heat generation by the hardware components within the information handling system, or the shape and design of the ion emitter/collector blower housing or chassis of the information handling system, among other factors. Each of the ion emitter blades 466 are coupled to an electrode of a high voltage source of an ionic driving circuit 472. In an embodiment, each of the ion emitter blades 466 includes a blade edge. In one embodiment, the blade edges may be made to come to a sharp point in order to facilitate the creation of more ions 476. In an embodiment, the ion emitter 464 of the ion emitter/collector blower 462 and the emitter blades 466 may be made of a refractory metal such as niobium, chromium, molybdenum, tantalum, tungsten, and rhenium among others. In an embodiment, the portions of the ion emitter/collector blower 462, ion emitter 464, and ion emitter blades 466 may be electroplated with a refractory metal such as niobium, chromium, molybdenum, tantalum, tungsten, and rhenium among others with an interior layer of ion emitter 464 and ion emitter blades 466 being made of a conductive material such as iron. It is appreciated that the ion emitter blades 466 may be made of any alloy of metal that includes alloys of those refractory metals described herein.

The ion emitter/collector blower 462 also includes an ion collector 468 with a distance 496 between the ion emitter 464 and ion collector 468 across which ions 476 may generate airflow 474. In an embodiment, the ion collector 468 includes a plurality of ion collector blades 470 through which air may pass and which are used to deionize those ions 476 created at the ion emitter 464 as described herein. The number of ion collector blades 470 may vary depending on an anticipated level of heat generation by the hardware components within the information handling system, or the shape and design of the ion emitter/collector blower housing or housing of the information handling system, among other factors such as the creation of ions 476 at the ion emitter 464. Each of the ion collector blades 470 are coupled to an electrode of a high voltage source of an ionic driving circuit 472 in an embodiment. In an embodiment, the ion collector blades 470 are coupled to a grounding source used to prevent arcing between the ion emitter 464 and ion collector 468. In an embodiment, each of the ion collector blades 470 includes a blade edge. It is appreciated that the ion collector blades 470 may be made of any alloy of metal that includes alloys of those refractory metals described herein.

As described herein, the ion emitter 464 and its ion emitter blades 466 as well as the ion collector 468 and its ion collector blades 470 are electrically coupled to a high voltage source (e.g., 2 kV to 10 kV voltage source difference between the ion emitter 464 and the ion collector 468). In an embodiment, the ionic driving circuit 472 may include a boost converter that provides, for the high voltage source of the ionic driving circuit 472, those voltages described herein to the ion emitter 464 and ion collector 468. An electric field is created across the distance 496 between the ion emitter 464 and the ion collector 468.

As described in embodiments herein, the ion collector 468 and ion emitter 464 of the ion emitter/collector blower 462 may be operatively coupled to an ionic driving circuit 464. In an embodiment, the ionic driving circuit 472 is controlled via the processor, the PMU with a hardware controller, and embedded controller, or a combination thereof. The ionic driving circuit 472, in an embodiment, includes a high voltage source that is operatively coupled to the ion emitter/collector blower 462. In an embodiment, the high voltage source may include a boost converter that steps up voltage from its input (e.g., a battery or AC power adapter) to the output at the ion emitter/collector blower 462. The high voltage source of the ionic driving circuit 472 causes the ion emitter 464 to emit ions 476 from the blade edges of each ion emitter blade 466. In the context of the present specification, the term "emit" or "emitter" is meant to describe an action and device that, at its edges or other surfaces, creates ions 476 and, via an electromagnetic repulsion, repels those ions 476 towards an attracting, oppositely charged source such as the ion collector 468 described herein. In an embodiment, the high voltage source of the ionic driving circuit 472 causes electrons to be ripped away from certain molecules such as gas molecules in the atmosphere thereby creating ions (e.g., positively-charged ions) at the edges or other surfaces of the ion emitter blades 466. This ionization process may include the removal of one or more electrons from the outer valence shells of the individual air molecules 494 within the gas such that they become positively charged (e.g., cations) in an embodiment. In an example where the interior of the ion emitter/collector blower housing includes atmospheric air, any number of types of air molecules 494 may be subjected to this process. For example, where the gas includes oxygen ($O_2$), the ionization of oxygen may include the removal of a single electron or two electrons from the oxygen molecule. This may lead to a $O_2^+$ or $O_2^{2+}$ ion (e.g., cation) being created by the ion emitter/collector blower 462 with the ionic driving circuit 472 in an embodiment. Other gas molecules or molecules within the atmosphere within the housing of the ion emitter/collector blower 462 may similarly be ionized such as nitrogen, carbon dioxide, argon, hydrogen, etc. to create other ions such as $N^{+1}$, $N^{+2}$, $N^{+3}$, $N^{+4}$, $N^{+5}$, $O_3$ (ozone), $H^{+1}$.

This ionization of the atmospheric gases within the ion emitter/collector blower 462 housing helps to create an airflow 474 within the ion emitter/collector blower 462 and its housing. In an embodiment, the movement of the ions 476 from the ion emitter 464 to the ion collector 468 creates a shearing force on the air (e.g., ions 476 drag non-ionized air molecules 494 and other ions 476) within the ion emitter/collector blower 462 housing across distance 496. This shearing force pulls the other air molecules 484 in the direction of the travel of the ions 476 created by the ion emitter/collector blower 462 with the electric field across distance 496 towards the ion collector 468 thereby creating this airflow 474. In an embodiment, the movement of the ions 476 (shown as positive ions indicated with a "+" sign) created and emitted from the ion emitter 464 may be from the ion emitter 464 to the ion collector 468. In an example embodiment, the ion emitter 464 may be operatively coupled to a positive electrode of the high voltage source of the ionic driving circuit 472. As a result of generating the positively charged ions 476, the charged ion emitter 464 now repels those positively charged ions 476 causing the charged ions 476 to be repelled away from the ion emitter 464, following the electric field created between the ion emitter 464 and ion collector 468 across distance 496, and attracted to the ion collector 468.

In an embodiment, the ion collector 468 is operatively coupled to a negative or opposite electrode of the high voltage source of the ionic driving circuit 472. In an embodiment, the ion collector 468 is operatively coupled to a grounding source or high voltage negative source of the ionic driving circuit 472. Whether the ion collector 468 is coupled to a negative electrode of the high voltage source or to ground of the high voltage source, the voltage difference between the ion emitter 464 and ion collector 468 as well as the distance 496 determines an electric field between the ion emitter 464 and the ion collector 468. The ions 476 created by the ion emitter 464 follow this electric field. In an embodiment where the ion collector 468 is operatively coupled to a negative electrode of the high voltage source and not ground, the ion collector 468 may be electrically insulated from the remaining portions of the ion emitter/collector blower and fan cooling system 454 and the housing of the ion emitter/collector blower 462 including the ion emitter 464. In an embodiment, this electrical isolation may be accomplished by making the ion emitter/collector blower 462 housing out of an electrically non-conductive material such as plastic. In an embodiment, the electrical isolation may be accomplished by placing an insulative gasket (not shown) between the ion collector 468 and the ion emitter/collector blower 462 housing and the ion emitter 464. The electrical isolation of the ion collector 468 allows for the electrical field between the ion emitter 464 and ion collector 468 to be formed allowing for an electrical field path for the ions 476 to follow.

In an embodiment, the creation of the electric field between the ion emitter 464 and ion collector 468 causes the positively-charged ions 476 created by the ion emitter 464 to be attracted to the negatively charged ion collector 468 further causing movement of the ions 476 and creating an airflow 474 within the ion emitter/collector blower 462 housing as described. As the positively-charged ions 476 reach the ion collector 468, those missing valence electrons stripped away by the ion emitter 464 at the ions 476 may be added to a valence shell of the ionized air molecules 494 placing those ions 476 at a neutral electrical charge again. Following the example of the ionization of the oxygen molecules in the air molecules 494 within ion emitter/collector blower 462 housing by the ion emitter 464, as these 0+ or $O^{2+}$ ions 476 (e.g., cations) have their extraneous electrons returned from at their valence electron shells (e.g., a single electron or two electrons, respectively) the oxygen molecules are placed in an electrically neutral state.

The creation of this airflow 474 via the ionic movement of the ions 476 created by the ion emitter 464 has a low-pressure head of around 0.04 to 0.05 inches of $H_2O$ (water column) as compared to the rotation of a fan or blower that may have a pressure head of around 0.5 inches of $H_2O$. However, the flow rate of air into and out of the ion emitter/collector blower 462 via operation of the ion emitter 464 and ion collector 468 creating ions 476 is relatively higher than the potential flow rate of air created by the rotation of a fan alone. By imparting relatively high airflow rate with lower pressure head, the acoustics of the ion emitter/collector blower and fan cooling system 454 can be reduced because the ion emitter/collector blower is silent or near silent in an embodiment allowing the fan speed to be reduced for the same airflow levels of a faster rotating fan. Further, placement of the ion emitter/collector blower and fan cooling system 454 in a chassis of an information handling system with a lower air intake vent 482 and a higher exhaust vent (not shown) proximate to the ion emitter/collector blower and fan cooling system 454, the airflow 474 may also be enhanced by convection due to a chimney effect through the information handling system chassis.

In an embodiment, the airflow 474 created by this movement of the ions 476 may supplement the airflow 474 created via the rotation of a fan formed within the fan housing 457 or activation of a blower with motor driver hardware 460. As such, in an embodiment, the rotation of the fan may be reduced in speed or stopped with the motor driver hardware 460 as compared to other fans that do not operate alongside an ion emitter/collector blower 462 in other information handling systems. Because the movement of the ions 476 creates an airflow 474, in some embodiments the rotation of the fan may be stopped allowing the cooling of the hardware within the housing of the information handling system by the ion emitter/collector blower 462 to be accomplished via the airflow 474 created by the creation of the ions 476 by the ion emitter 464. In some embodiments where the heat of the hardware within the housing of the information handling system increases, the hardware processor executing code instructions of the ion emitter/collector blower and fan control system with the self-driving cooling system reinforcement learning agent may direct motor driver hardware to drive a fan motor to turn the fan so that the additional airflow 474 created by the rotation of the fan blades to increase the speed of the airflow 474 further according to embodiments herein. This allows the noise associated with the rotation of the fan to be reduced or even eliminated during relatively cool temperatures within the housing of the information handling system thereby often decreasing the noise heard by the user of the information handling system. As a result, in an embodiment, the ion emitter/collector blower and fan cooling system 454 described herein may have a noiseless base capability of cooling the information handling system with a backup cooling system via actuation of a fan motor to rotate the fan blades under control of executing code instructions of the ion emitter/collector blower and fan control system with the self-driving cooling system reinforcement learning agent as described herein. This may further increase the user satisfaction of the information handling system during operation of the information handling system by decreasing fan noise heard by the user in some operating embodiments. In an embodiment, the fan may be prevented from rotating unless a threshold temperature has been reached or other factors input into executing code instructions of the ion emitter/collector blower and fan control system with the self-driving cooling system reinforcement learning agent. Still further, the decision to rotate the fan may additionally, or alternatively, depend on the power source provided to the information handling system such as whether the information handling system is operating on power from the battery or whether the power is provided to the information handling system via an AC power adapter as determined via executing code instructions of the ion emitter/collector blower and fan control system with the self-driving cooling system reinforcement learning agent. Alternatively, or additionally, the activation of the fan may be dependent on the system performance mode under which the information handling system is operating as determined according to executing code instructions of the ion emitter/collector blower and fan control system with the self-driving cooling system reinforcement learning agent. For example, the activation of the fan may be based on whether the information handling system is operating under a performance mode or a power mode.

It is appreciated that, in an embodiment, a positive electrode of the high voltage source of the ionic driving circuit 472 may be operatively coupled to the ion collector 468 structure with the negative electrode of the high voltage source operatively coupled to the ion emitter 464 structure so the airflow 474 is reversed. In this example embodiment, the ion collector 468 structure of the ion emitter/collector blower 462 may strip electrons from the air molecules 494 creating a positively-charged ions 476 (e.g., cations) whereby the ion collector 468 structure operates, even temporarily, as an ion emitter. This allows the airflow 474 created by the shearing force of the created ions 476 to be reversed in an opposite direction than that shown in FIG. 4. In an embodiment, this may be done so that any dust or debris collecting within the ion emitter/collector blower 462 housing, or the base chassis of the information handling system may be dislodged. Because the fan is placed at an air intake vent 482, any dust or debris collected via this reversed airflow 474 may be passed out of the housing of the information handling system via this air intake vent 482. The ionic driving circuit 472 may, therefore, selectively reverse the operatively connection of the electrodes to the ion emitter 464 and ion collector 468 to change the direction of airflow 474 as described in order to perform this internal cleaning process via execution of the ion emitter/collector blower and fan control system.

As described herein, code instructions of the self-driving cooling system reinforcement learning agent and ion emitter/collector blower and fan control system may be executed by a hardware processing device on the information handling system 400. In an embodiment, a generically trained self-driving cooling system reinforcement learning agent may be initially uploaded onto a memory device on the information handling system 400 by the manufacturer. The generic training of the self-driving cooling system reinforcement learning agent may include policies that initiate actions by the ion emitter/collector blower and fan control system in order to reduce the temperature within the housing of the information handling system 400 as well as mitigate noise produced by the cooling fan (e.g., when activated) and mitigate ozone produced by the operation of the ion emitter/collector blower as described herein. As described herein, these initial and generic policies are updated through the operation of the reinforcement learning algorithm by the self-driving cooling system reinforcement learning agent. In an embodiment, the self-driving cooling system reinforcement learning agent may monitor for positive metrics and negative metrics as described herein. In an embodiment, the extent of the positive outcome associated with the positive metrics may indicate a weight to be associated with the positive outcomes. Additionally, in an embodiment, the extent of the negative outcome associated with the negative metrics may indicate a weight to be associated with the negative outcomes. A summation of all weighted negative metrics may be subtracted from a summation of all weighted positive outcomes in order to arrive at a "total reward" metric. Such positive, negative, or total reward metrics may be fed back into the reinforcement learning algorithm.

For example, this total reward metric may be used as input to the self-driving cooling system reinforcement learning agent and, specifically, the reinforcement learning algorithm to customize those policies used by the self-driving cooling system reinforcement learning agent in order to adjust the actions initiated by the ion emitter/collector blower and fan control system. During this process, the self-driving cooling system reinforcement learning agent receives all observed states of the information handling system 400 such as temperature and telemetry data and determines whether the total reward metric is improving the observed states of the information handling system 400 including a reduction or leveling of the temperature within the housing of the information handling system 400 and/or reduction or leveling of the ozone produced by the ion emitter/collector blower.

Therefore, as the user uses the information handling system, the self-driving cooling system reinforcement learning agent increases effectiveness of generated recommendations of how best to mitigate temperature increases and ozone increases under a variety of circumstances with the ion emitter/collector blower and fan control system. As described herein, these circumstances include those operating characteristics of the information handling system by the user and the operational states of the information handling system. For example, where the user is operating the information handling system 400 under a performance mode using a DC power source, the redial actions by the self-driving cooling system reinforcement learning agent may differ from those actions by the self-driving cooling system reinforcement learning agent when, for example, the user is operating the information handling system 200 under a quiet mode and using an AC power source. As the self-driving cooling system reinforcement learning agent detects these operating characteristics of the information handling system by the user and operational states of the information handling system, it adjusts the actions taken based on past metrics (e.g., negative and positive metrics) thereby adjusting the operations of the ion emitter/collector blower and cooling fan to accommodate for these different use cases.

Figure 5:
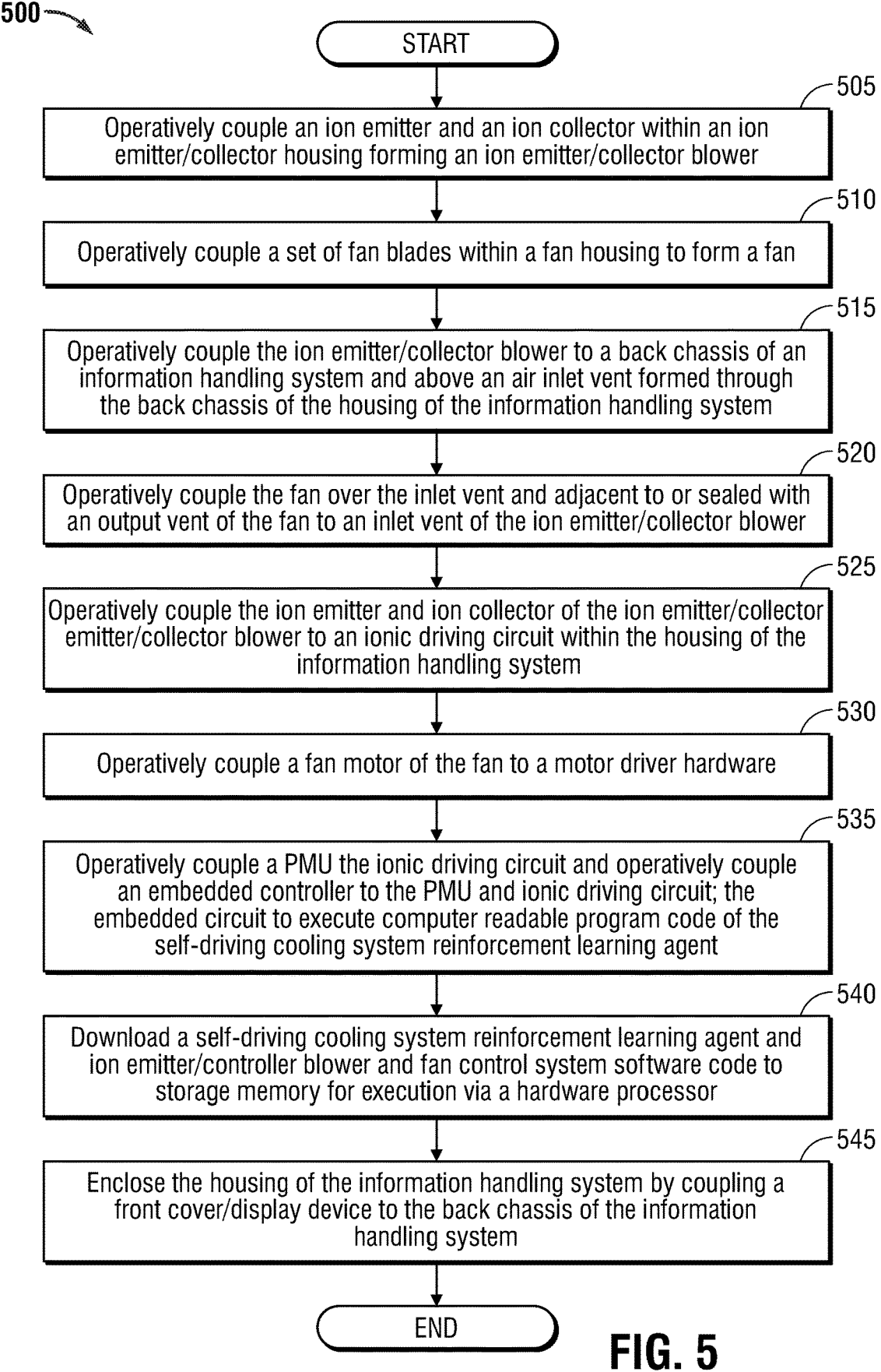
FIG. 5 is a flow diagram of a method of assembly of an information handling system with ion emitter/collector blower and cooling fan with a self-driving cooling system reinforcement learning agent and a control system according to an embodiment of the present disclosure.

FIG. 5 is a flow diagram of a method of manufacture of an information handling system including an ion emitter/collector blower in series with a fan according to an embodiment of the present disclosure. The method 500 includes, at block 505, operatively coupling an ion emitter and an ion collector within an ion emitter/collector housing forming an ion emitter/collector blower. As described herein, the ion emitter described herein include a plurality of emitter blades through which air may pass and which are used to create an airflow into, through, and out of the ion emitter/collector blower housing of the ion emitter/collector blower. The number of emitter blades may vary depending on an anticipated level of heat generation by the hardware components within the information handling system, or the shape and design of the ion emitter/collector blower housing or chassis of the information handling system, among other factors described herein. Each of the emitter blades, as described herein, are coupled to an electrode of a high voltage source of an ionic driving circuit during operation of the ion emitter/collector blower. In an embodiment, each of the emitter blades includes a blade edge. In one embodiment, the blade edges may be made to come to a sharp point in order to facilitate the creation of more ions during operation of the ion emitter/collector blower. In an embodiment, the ion emitter of the ion emitter/collector blower and the emitter blades may be made of a refractory metal such as niobium, chromium, molybdenum, tantalum, tungsten, and rhenium among others. In an embodiment, the portions of the ion emitter/collector blower cooling system and emitter blades may be electroplated with a refractory metal such as niobium, chromium, molybdenum, tantalum, tungsten, and rhenium among others with an interior layer of the ion emitter/collector blower cooling system and emitter blades being made of a conductive material such as iron. It is appreciated that the emitter blades may be made of any alloy of metal that includes alloys of those refractory metals described herein.

The ion emitter/collector blower cooling system also includes an ion collector with a distance between the ion emitter and ion collector across which ions may generate airflow. In an embodiment, the ion collector includes a plurality of collector blades through which air may pass and which are used to deionize those ions created at the ion emitter as described herein. The number of collector blades may vary depending on an anticipated level of heat generation by the hardware components within the information handling system, or the shape and design of the ion emitter/collector blower housing or housing of the information handling system, among other factors such as the creation of ions at the ion emitter during operation of the ion emitter/collector blower. Each of the collector blades are coupled to an electrode of a high voltage source of an ionic driving circuit in an embodiment. In an embodiment, the collector blades are coupled to a grounding source used to prevent arcing between the first ion emitter and first ion collector. In an embodiment, each of the collector blades includes a blade edge. It is appreciated that the collector blades may be made of any alloy of metal that includes alloys of those refractory metals described herein.

The method 500 includes, at block 510, operatively coupling a set of fan blades of an impeller within a fan housing to form a cooling fan. As described herein, the fan may include a fan housing that houses a series of fan blades that are operatively coupled to a fan motor. In an embodiment the fan blades of the impeller may include a plurality of blades that are formed together at a central hub. This central hub of the impeller may be operatively coupled to a shaft of the fan motor so that the rotation of the shaft will impart a rotation of the fan blades and central hub during operation of the fan described herein.

The method 500 further includes, at block 515, operatively coupling the ion emitter/collector blower to a back chassis of an information handling system and above an air inlet vent formed through the back chassis of the housing of the information handling system. In an embodiment, the ion emitter/collector blower may be placed within the back chassis of the information handling system at a location vertically above the air intake vent such that enough space is available for a fan and its fan housing to be placed over this air intake vent in the back cover. In an embodiment, the ion emitter/collector blower may be placed a distance away from a top side wall of the housing of the information handling system where one or more air exhaust vents are formed. The placement of the ion emitter/collector blower a distance away form a top side wall allows for heat generating components or other passive heat conducting devices to be placed between the ion emitter/collector blower and the air exhaust vents.

The method 500 further includes, at block 520, operatively coupling the fan over the inlet vent and couple an output of the fan to an inlet of the ion emitter/collector blower. In some embodiments, the coupling of the fan output to the inlet of the ion emitter/collector blower may be sealed. In one embodiment, the output of the fan is sealed against the input of the ion emitter/collector blower so that air passing from the housing of the fan may pass directly into the inlet of the ion emitter/collector blower. In an embodiment, the housing at the air output of the fan may be similarly sized to the air intake of the ion emitter/collector blower. In an embodiment, the sealing of the output of the fan is against the input of the ion emitter/collector blower may be conducted prior to either the ion emitter/collector blower or fan being operatively coupled to the back chassis of the information handling system.

The hardware processor of the information handling system, in an example embodiment, may be placed vertically or at the same level or higher than the fan and/or ion emitter/collector blower. The placement of the hardware processor or other heat generating hardware component above the fan and/or ion emitter/collector blower allows for the operation of the fan and ion emitter/collector blower to clear air generated by the heat generating device from the chassis area where that heat generating device is located. Further, the location of the inlet vents, the fan, the ion emitter/collector blower, and the outlet exhaust vents may provide for a chimney effect in some embodiments. The chimney effect, in the present specification, pulls air into the housing of the information handling system via the air intake vent and out of the housing via an air exhaust vent located at an upper location due to the differences in air buoyancy between the air inside the housing of the information handling system and the air outside of the information handling system for convection-assisted airflow which may further assist the active cooling structures of the ion emitter/collector blower and fan cooling system. With the in-series fan and ion emitter/collector blower, when the air within the housing of the information handling system is heated due to the operation of the heat-generating hardware components, cool air is pulled into the housing and accelerated through the housing via operation of the fan and ion emitter/collector blower. Control of the fan and the ion emitter/collector blower according to embodiments herein provides for control of the amount of cold air drawn into and heated air passed out of the housing of the information handling system during operation of the information handling system according to embodiments herein.

The method 500 further includes, at block 525, operatively coupling the ion emitter and ion collector of the ion emitter/collector blower to an ionic driving circuit within the housing of the information handling system. As described herein, the ion emitters include a plurality of emitter blades through which air may pass and which are used to create an airflow into, through, and out of the ion emitter/collector blowers as described. Each of the emitter blades are coupled to an electrode of a high voltage source of an ionic driving circuit. In an embodiment, each of the emitter blades includes a blade edge. In one embodiment, the blade edges may be made to come to a sharp point in order to facilitate the creation of more ions during operation of the ion emitter/collector blower.

Additionally, the ion collectors include a plurality of collector blades through which air may pass and which are used to deionize those ions created at the ion emitter as described herein. Each of the collector blades are coupled to an electrode of a high voltage source of an ionic driving circuit in an embodiment. In an embodiment, the collector blades are coupled to a grounding source used to prevent arcing between the ion emitter and ion collector. In an embodiment, each of the collector blades includes a blade edge. It is appreciated that the ion collector blades may be made of any alloy of metal that includes alloys of those refractory metals described herein.

As described herein, the ion emitter and its blades as well as the ion collector and its blades are electrically coupled to a high voltage source (e.g., 2 kV to 10 kV voltage source difference between the ion emitter and the ion collector). In an embodiment, the ionic driving circuit may include a boost converter that provides, for the high voltage source of the ionic driving circuit, those voltages described herein to the ion emitter and ion collector.

The method 500 further includes, at block 530, operatively coupling a fan motor of the fan to a motor driver hardware. As described herein, a processor, an embedded controller, or other hardware processor may direct a motor driver hardware to drive the fan motor to turn the fan so that the additional airflow created by the rotation of the fan blades may increase the velocity of the airflow further into the ion emitter/collector blower and out of the housing of the information handling system during operation.

At block 535, a PMU is operatively coupled to the ionic driving circuit. The PMU may provide power to the ionic driving circuit so that the voltages necessary to create ions at the ion emitter can be provided to the ion emitter during operation of the information handling system and the ion emitter/collector blower. In an embodiment, a hardware PMU controller, a hardware processor, and/or an embedded controller may be operatively coupled to the ionic driving circuit to control the levels of voltages applied to the ion emitters and ion controllers as described herein.

At block 535, the PMU is also operatively coupled to an embedded controller (e.g., hardware embedded controller) or other hardware processing device with the embedded controller configured to execute computer readable program code of the self-driving cooling system reinforcement learning agent. At block 540, the method 500 includes downloading a self-driving cooling system reinforcement learning agent and ion emitter/collector blower and fan control system software code to storage memory for execution via a hardware processor. This download process may be conducted via a wireless connection to a wireless network.

Again, the self-driving cooling system reinforcement learning agent may be executed by a hardware processing device on the information handling system. In an embodiment, a generically trained self-driving cooling system reinforcement learning agent of the ion emitter/collector blower and fan control system may be initially uploaded onto a memory device on the information handling system by the manufacturer to a memory device that is accessible to the embedded controller. The generic training of the self-driving cooling system reinforcement learning agent may include policies that initiate actions by the ion emitter/collector blower and fan control system in order to reduce the temperature within the housing of the information handling system 400 as well as mitigate noise produced by the cooling fan (e.g., when activated) and mitigate ozone produced by the operation of the ion emitter/collector blower described herein. As described herein, these initial and generic policies are updated through the operation of the reinforcement learning algorithm by the self-driving cooling system reinforcement learning agent. In an embodiment, the self-driving cooling system reinforcement learning agent may monitor for positive metrics and negative metrics as described herein. In an embodiment, the extent of the positive outcome associated with the positive metrics may indicate a weight to be associated with the positive outcomes. Additionally, in an embodiment, the extent of the negative outcome associated with the negative metrics may indicate a weight to be associated with the negative outcomes. A summation of all weighted negative metrics may be subtracted from a summation of all weighted positive outcomes in order to arrive at a "total reward" metric.

This total reward metric, or individualized positive or negative metrics, may be used as input to the self-driving cooling system reinforcement learning agent and, specifically, the reinforcement learning algorithm to customize those policies used by the self-driving cooling system reinforcement learning agent in order to adjust the actions initiated by the ion emitter/collector blower and fan control system. During this process, the self-driving cooling system reinforcement learning agent receives all observed states of the information handling system 400 such as temperature and telemetry data and determines whether the total reward metric is improving the observed states of the information handling system 400 including a reduction or leveling of the temperature within the housing of the information handling system 400 and/or reduction or leveling of the ozone produced by the ion emitter/collector blower.

Therefore, as the user uses the information handling system, the self-driving cooling system reinforcement learning agent improves effectiveness of its recommendations of how best to mitigate temperature increases and ozone increases under a variety of circumstances. As described herein, these circumstances include those operating characteristics of the information handling system by the user and the operational states of the information handling system. For example, where the user is operating the information handling system 400 under a performance mode using a DC power source, the remedial actions by the self-driving cooling system reinforcement learning agent may and ion emitter/collector blower and fan control system differ from those actions by the self-driving cooling system reinforcement learning agent and ion emitter/collector blower and fan control system when, for example, the user is operating the information handling system 200 under a quiet mode and using an AC power source. As the self-driving cooling system reinforcement learning agent detects these operating characteristics of the information handling system by the user and operational states of the information handling system, it adjusts the actions taken based on past metrics (e.g., negative metrics, positive metrics, or total reward metrics) thereby adjusting the operations of the ion emitter/collector blower and cooling fan to accommodate for these different use cases.

The method 500 includes, at block 545, enclosing the housing of the information handling system by coupling a front cover/display device to the back chassis of the information handling system. In an embodiment, the front cover/display of the information handling system may be a touch display device that also or alternatively allows the user to provide input to the information handling system. As described herein, the information handling system includes the back cover and front cover/display and may, in an example embodiment, form a tablet-type or two-in-one information handling system. In an embodiment, the back cover and front cover/display may be used to house a processor at the processor location as well as one or more ion emitter/collector blower cooling systems at an ion emitter/collector blower cooling system location. Other hardware components such as a battery, a memory device, and a memory device are also housed within the housing of the tablet-type information handling system. The front cover/display, as described herein, includes a front cover/display that serves both to cover this hardware as well as an input and output device via the touch screen video display device as described herein. At this point, the method 500 may end.

Figure 6A:
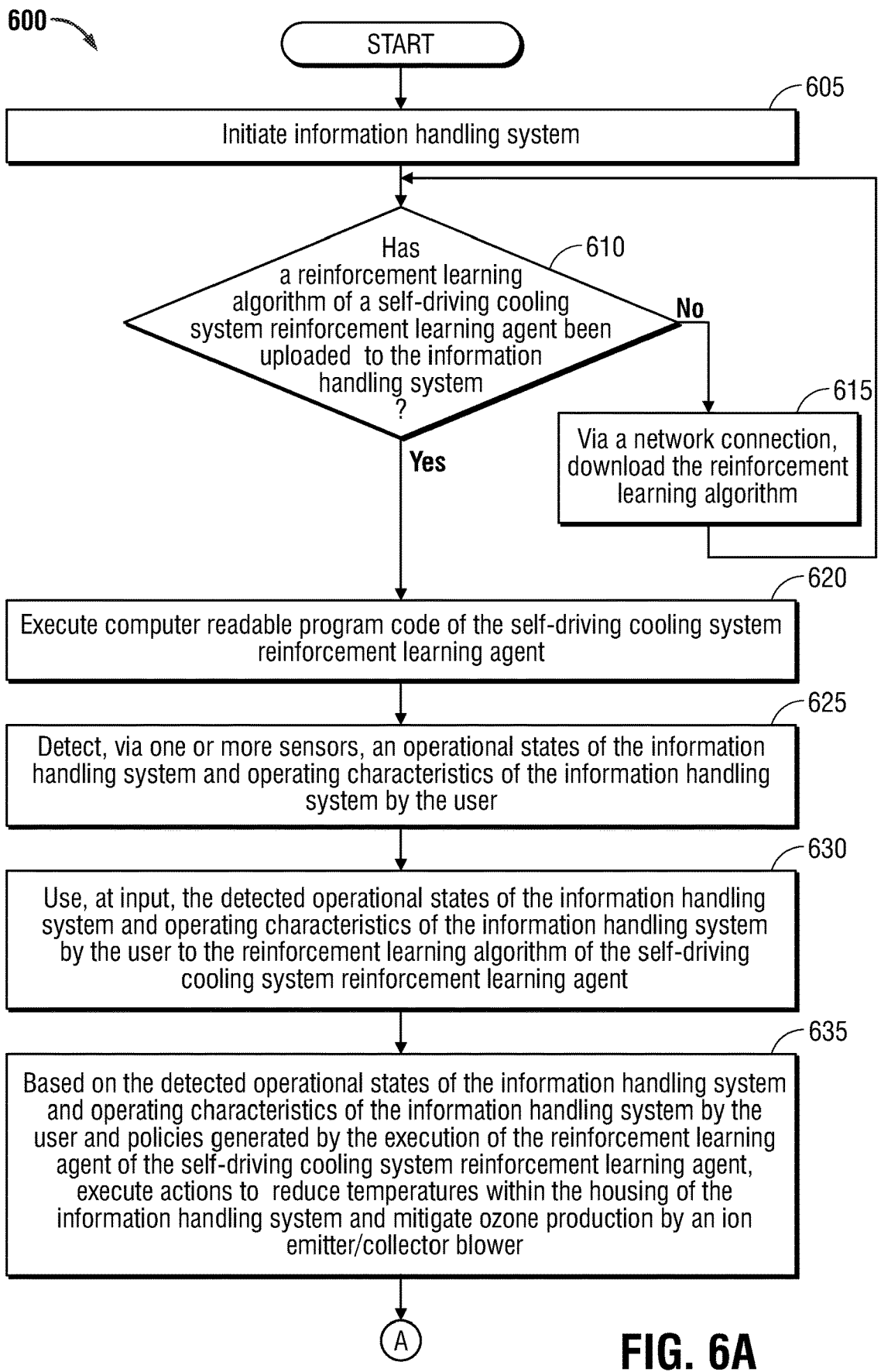
FIGS. 6A and 6B is a flow diagram of a method of controlling the activation of an ion emitter/collector blower and/or a cooling fan via a self-driving cooling system reinforcement learning agent and a control system according to an embodiment of the present disclosure.
Figure 6B:
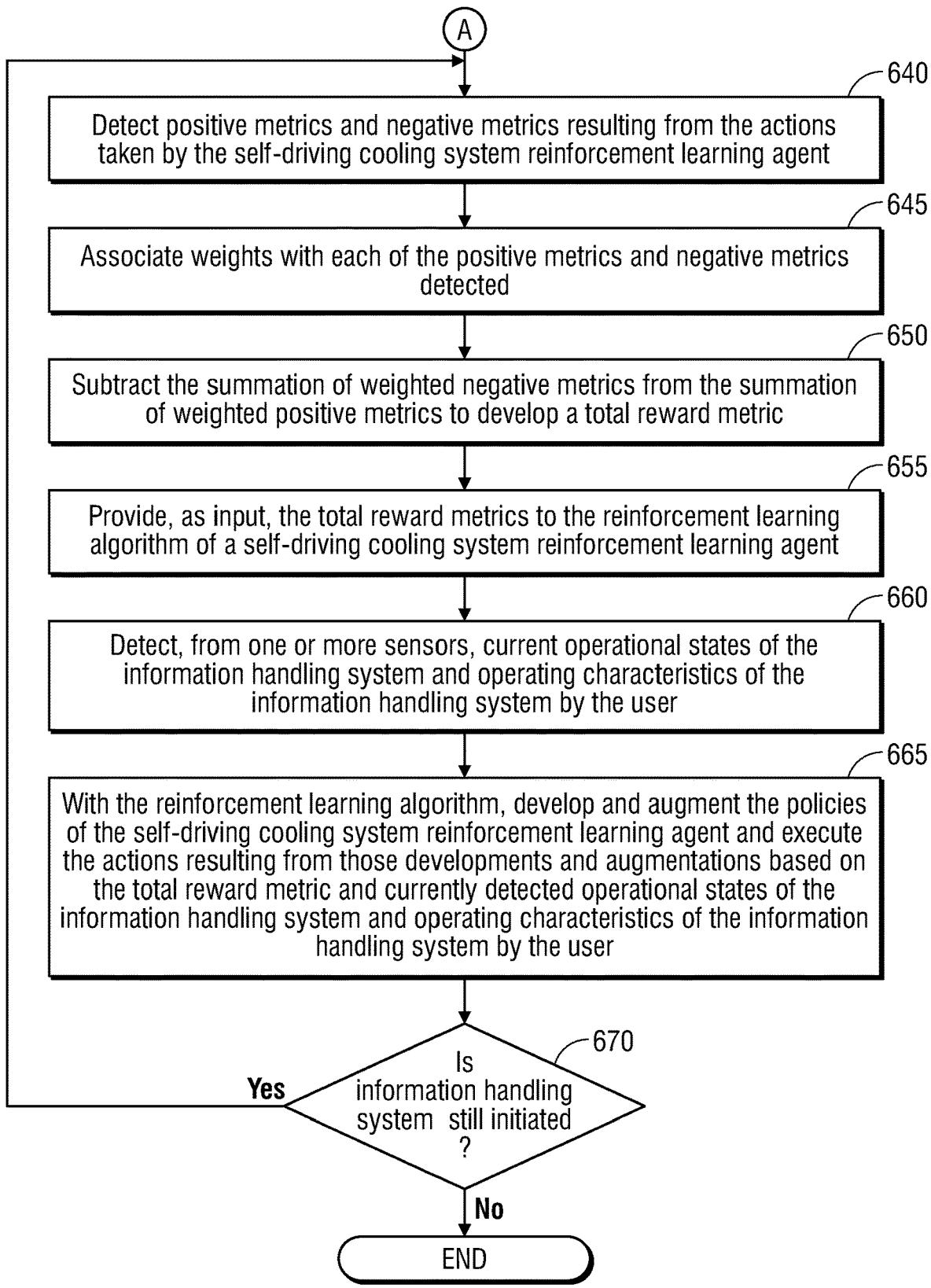

FIGS. 6A and 6B is a flow diagram of a method 600 of controlling the activation of an ion emitter/collector blower and/or a cooling fan via a self-driving cooling system reinforcement learning agent and ion emitter/collector blower and fan control system according to an embodiment of the present disclosure. The method 600 describes the reiterative processes of execution of code instructions for the self-driving cooling system reinforcement learning agent as well as the intelligent ozone estimation and mitigation system described herein in order to control of the operation of the ion emitter/collector blower and cooling fan with the ion emitter/collector blower and fan control system described herein. This reiterative process in execution of code instructions for the self-driving cooling system reinforcement learning agent customizes the operations of the ion emitter/collector blower cooling system and the cooling fan in order to control the temperatures within the housing of the information handling system and ozone produced by the based on the operating characteristics of the information handling system by the user.

The method 600 includes, at block 605, with initiating the information handling system. This initiation process at block 605 may be conducted by the user actuating, for example, a power button key on the information handling system. The actuation of this power button may cause the execution of a native BIOS, a native OS, or other code instructions used and executed by the processor of the information handling system to operate the hardware within the information handling system including the ion emitter fan cooling system described herein.

The initiation of the information handling system by the user causes the BIOS and/or OS to execute, via a hardware embedded controller or other hardware processing device, the self-driving cooling system reinforcement learning agent described herein. As described herein the self-driving cooling system reinforcement learning agent and ion emitter/collector blower and fan control system may be comprised of computer readable program code that, when executed by a hardware processing device, executes the processes associated with the reinforcement learning algorithm and control of the ion emitter/collector blower and the cooling fan described herein.

The method 600 may continue with determining if a reinforcement learning algorithm of the self-driving cooling system reinforcement learning agent has been uploaded to the information handling system. In an embodiment, the reinforcement learning algorithm may be shipped with the information handling system and may include a generally-trained reinforcement learning algorithm that executes generic actions in order to initiate the reinforcement learning process described herein. In another embodiment, the user may be presented with the option to download the computer readable program code defining the reinforcement learning algorithm or an updated reinforcement learning algorithm for the self-driving cooling system reinforcement learning agent. In either embodiment, at block 610, where the hardware processing device detects that the reinforcement learning algorithm has not been downloaded or is not present with the self-driving reinforcement learning agent, the method 600 continues to block 615 with, via a network connection, downloading the reinforcement learning algorithm for the self-driving cooling system reinforcement learning agent. The method 600 then returns to bock 610 with the determination if the reinforcement learning algorithm is present. Where the reinforcement learning algorithm is present at block 610 or it is determined that the reinforcement learning algorithm was downloaded, the method 600 continues to block 620.

At block 620 the method 600 continues with executing the computer readable program code of the self-driving cooling system reinforcement learning agent that includes the reinforcement learning algorithm an execution of the ion emitter/collector blower and fan control system. This execution of the self-driving cooling system reinforcement learning agent causes, at block 625, the hardware embedded controller to begin to detect, via one or more sensors, an operational states of the information handling system and operating characteristics of the information handling system by the user. For example, an operating state of the information handling system may include hardware utilization levels that detect. A hardware utilization level may include the processing resources used at the hardware processor, a CPU, the GPU or other hardware processing device, battery power consumption, AC power consumption, memory read/write processes, and the like. Another operating state of the information handling system includes the execution of foreground and/or background applications. Another operating state of the information handling system includes settings associated with a BIOS and OS including processor throttling settings or lack thereof, executed driver software, RAM usage, and the like.

Yet another operating state of the information handling system includes power settings and modes such as whether the information handling system is drawing power from a battery or an AC power adapter and whether the user has selected for the information handling system to operate in a power mode, a performance mode, or a quiet mode or some combination thereof. In the context of the present specification, a performance mode may be an operating mode under which the information handling system prioritizes the performance of the information handling system that includes prioritizing the power limits to maximize performance especially when executing program applications such as the hardware processor associated with content creation. In the context of the present specification, a power mode may be an operating mode under which the information handling system prioritizes the power consumption by the hardware devices when, for example, the information handling system is operating on power provided by the battery. In the context of the present specification, a quiet mode may be an operating mode that prioritizes the deactivation of the cooling fan and activation of the ion emitter/collector blower in order to reduce the noise created by the cooling fan during operation. This quiet mode may take into consideration the thermal characteristics of the information handling system as it operates (e.g., thermal temperatures of hardware devices such as the hardware processor or GPU) as well as acoustic settings set by a user (e.g., user-selected thermal tables, etc.).

In an embodiment, the operational characteristics of the information handling system by the user includes the detection of the presence of a user at or near the information handling system. In an embodiment, the information handling system includes a camera, a web cam, thermal camera, or other similar imaging device. This imaging device may be used to determine whether the user is in front of the imaging device and, accordingly, in front of or near the information handling system. The focus of the user and/or the focus of the user relative to the focus of the background or foreground may also be detected and used as an operational characteristic of the information handling system by the user (e.g., out of focus means the user is too close or too far away from the information handling system).

The orientation of the information handling system may also be used, in an example embodiment, as part of the operational characteristics of the information handling system by the user. In an example, the information handling system may be a laptop-type information handling system that includes a base portion operatively coupled to a display portion via a hinge. The orientation of this base portion relative to the display portion may define one of a closed orientation, a laptop orientation, a tablet orientation, a dual tablet configuration, and a tent orientation, among other orientations. The closed orientation is an orientation where the display portion of the laptop-type information handling system is closed onto the base portion of the information handling system with the display of the display portion not being visible. The tablet configuration is an orientation where the information handling system is in a tablet form or where the base portion of the information handling system is made to flip behind the display portion. In a dual tablet configuration, the information handling system may be made of a base portion that includes a separate base chassis display device along with the display device of the display portion of the information handling system or a single foldable display that may span both chassis of a dual-display information handling system. In this dual tablet configuration, the base portion and display portion are laid open to reveal both display devices or an entire foldable display to the user. In a laptop configuration, the information handling system may have the base portion on a table or on the user's lap with the display portion upright and viewable to the user. In a tent configuration, the display portion may be viewable to the user with the base portion in an orientation to prop up the display portion on a table, for example. It is appreciated that the orientation of the information handling system is different where the information handling system is a tablet-type information handling system. The placement of the user relative to the information handling system may be used as a metric by the self-driving cooling system reinforcement learning agent to mitigate, when necessary, amounts of ozone that are produced by operation of the ion emitter/collector blower as described below.

In an embodiment, an operational characteristic of the information handling system by the user may also include a location of a user such as whether the user and the information handling system are indoors or outdoors. Similar to above, the location of the user and the information handling system may also be used as a metric by the self-driving cooling system reinforcement learning agent to mitigate, when necessary, amounts of ozone that are produced by operation of the ion emitter/collector blower as described below.

In an embodiment, an operating characteristic of the information handling system includes audio/video profiles. It is appreciated that audio produced by one or more speakers in the information handling system may drown out other sounds such as those made by, for example, the cooling fan when operating. An increase in noise of the cooling fan may not be as noticeable by the user if sounds from the A/V systems of the information handling system are louder than the operation of the cooling fan. In an embodiment, a microphone may also detect noise levels of the cooling fan for input to the self-driving cooling system reinforcement learning agent.

In an embodiment, the operating characteristics of the information handling system by the user includes the detection if, how many, and what peripheral devices are connected to the information handling system either wirelessly or via a wired connection. Execution of drivers associated with these peripherals by the hardware processing resources (e.g., hardware processor) and operation of the wireless interface adapter may increase the amount of heat produced within the housing of the information handling system. As described herein, the self-driving cooling system reinforcement learning agent may be initiated based on metrics that include these operating characteristics of the information handling system by the user and these operational states of the information handling system.

In an example embodiment, the user may be operating the information handling system under a performance mode, while the information handling system is powered via an A/C power adapter, the user is engaged in a gaming application, a mouse and keyboard are used by the user to interact with the gaming application, the information handling system is located indoors and within a detected room, and the user is using a headset to listen to the audio provided by the information handling system. This use-case is referred herein to provide, as an example, the possible policy development and actions taken by the self-driving cooling system reinforcement learning agent to control temperatures within the housing of the information handling system and mitigate the creation of ozone by the ion emitter/collector blower. It is appreciated that these operating characteristics of the information handling system by the user are presented as an example of the operating characteristics of the information handling system by the user and are presented as an example for ease of understanding. It is further appreciated that other operating characteristics of the information handling system by the user may be present and may change overtime as the user interacts with the information handling system. In this example embodiment, the performance mode may also prioritize the operation of the hardware processor over the cooling of the hardware within the information handling system in order to provide those processing resources to the user during the user's gaming experience.

The method 600 may also include using, as input, the detected operating characteristics of the information handling system by the user and operational states of the information handling system to the reinforcement learning algorithm of the self-driving cooling system reinforcement learning agent at block 630. As described herein, the information handling system may include a plurality of sensors that detect the operational states of the information handling system including temperatures within the housing of the information handling system, estimated ozone generation by the ion emitter/collector blower, fan noise levels, and orientation of the information handling system. For example, these sensors, in an embodiment, may include temperature sensors such as thermistors that detect a current temperature within the housing of the information handling system and/or the temperature of individual hardware devices such as the hardware processor. Other sensors may include a microphone or telemetry sensors that are both within the housing of the information handling system or located at one or more access points and base stations. The telemetry sensors may provide data to the embedded controller to determine the location of the information handling system (e.g., inside, outside, near a base station, near an access point, etc.). Other metrics described herein are also provided to the embedded controller or other hardware processor executing the self-driving cooling system reinforcement learning agent to provide data for implementation of the general policies described herein.

At block 635, the method 600 includes executing code instructions of the ion emitter/collector blower and fan control system to execute actions to reduce temperatures within the housing of the information handling system and mitigate ozone production by an ion emitter/collector blower and/or a cooling fan based on the detected operational states of the information handling system and operating characteristics of the information handling system by the user and policies yielding recommendations generated by the execution of the reinforcement learning agent of the self-driving cooling system reinforcement learning agent. These actions may be based on generic policies defined by computer readable program code of the self-driving cooling system reinforcement learning agent and those detected operational states of the information handling system and operating characteristics of the information handling system by the user. The generic policies may be those policies that have yet to be augmented, deleted, or created via the process described herein in connection with the method 600 of FIGS. 6A and 6B. As soon as a first iteration of the execution of the self-driving cooling system reinforcement learning agent is completed as described herein, the generic policies used to execute actions become customized policies; customized to the user's use of the information handling system and operational states of the information handling system.

In an embodiment, the policies and recommendations generated by the self-driving cooling system reinforcement learning agent cause the ion emitter/collector blower and fan control system to execute actions such as initiating the ion emitter/collector blower, controlling the voltage applied to the ion emitter of the ion emitter/collector blower, initiating the cooling fan, controlling the speed of rotation of the fan blades of the cooling fan, and executing the intelligent ozone estimation and mitigation system as described herein. In an embodiment, the policies and recommendations generated by may result in actions that cause the operation of the ion emitter/collector blower to be prioritized over the operation of the cooling fan in order to reduce the amount of noise emitted by the operation of the cooling fan. However, the operating characteristics of the information handling system by the user may affect, in some iterations, which actions are recommended by the self-driving cooling system reinforcement learning agent. Continuing with the example of the gaming user above, because the user is implementing headphones, the noise associated with the operation of the cooling fan may not be of much of a concern. The reinforcement learning algorithm is provided with this information and the resulting policies and actions are, therefore, affected by this operating characteristic. However, the operation of the ion emitter/collector blower may still be prioritized via the ion emitter/collector blower and fan control system before the operation of the cooling fan with, in an example, the cooling capabilities of the ion emitter/collector blower being maximized before the cooling fan is initiated. Alternatively, in this example use case scenario with the user, the initiation of the ion emitter/collector blower may be prioritized over the cooling fan with the cooling fan being initiated when a certain temperature is reached even when the cooling capabilities of the ion emitter/collector blower is not maximized. In this example embodiment, the operation of the ion emitter/collector blower at its maximum cooling capabilities may create more ozone than is allowed as described herein. By allowing both the ion emitter/collector blower and cooling fan to operate in series, the ozone creation may be reduced.

At block 640, the method 600 continues with detecting positive metrics and negative metrics resulting from the action recommended or initiated by the self-driving cooling system reinforcement learning agent and the policies associated therewith and taken by the ion emitter/collector blower and fan control system. In an example embodiment, a positive outcome from an action initiated by the self-driving cooling system reinforcement learning agent may include a drop in or maintenance of a temperature within the housing of the information handling system, a decrease in power consumption, a decrease in ozone levels, a decrease in noise produced by the cooling fan (e.g., fan blade speed reduced), and the like. In an example embodiment, a negative outcome from an action initiated by the self-driving cooling system reinforcement learning agent may include an increase in temperature within the housing of the information handling system, an increase in power consumption, a decrease in ozone levels, an increase in noise produced by the cooling fan, and the like.

In an embodiment, the positive and negative metrics (e.g., outcomes from actions initiated by the self-driving cooling system reinforcement learning agent) may be associated with weights at block 645. These weights may be associated with each of the positive metrics based on how the actions taken by the ion emitter/collector blower and fan control system pursuant to the intelligent ozone estimation and mitigation system, for example, reduced the temperature, decreased power consumption, reduced ozone levels, decreased noise levels and how well those actions cause the operation of the information handling system to remain within parameters indicated by the operating characteristics of the information handling system by the user (e.g., met standards of a performance mode, quiet mode, and/or power mode). These weights may be associated with each of the negative metrics based on how the actions taken by the ion emitter/collector blower and fan control system pursuant to the intelligent ozone estimation and mitigation system, for example, increased the temperature, increased power consumption, increased ozone levels, increased noise levels and how well those actions cause the operation of the information handling system to fall outside of parameters indicated by the operating characteristics of the information handling system by the user (e.g., met standards of a performance mode, quiet mode, and/or power mode). It is appreciated that other metrics such as processor throttling, GPU throttling, and battery power consumption, among other metrics may be monitored and categorized as either beneficial (e.g., a positive metric) or disadvantageous (e.g., a negative metric) to the operation of the information handling system under the operating characteristics of the information handling system by the user.

Continuing with the example presented above, a positive metric may include the lack of throttling or proper management of the processing resources of the hardware processor or GPU as the user is engaged in a gaming application. To the extent that that hardware processors are not throttled despite additional processing needs, this positive metric may be associated with a higher valued weight. It is expected, when executing a gaming application, that a significant amount of processing resources are to be used to properly execute that gaming application. However, as the processing resources are used up, temperatures may begin to increase within the housing of the information handling system. This increase in temperature, in this example embodiment, may be indicated as a negative metric, however. To the extent that the temperature within the housing of the information handling system is increased, a lower or higher valued weight may be associated with this metric.

Another positive metric may include the detection that the increase in voltage to the ion emitter of the ion emitter/collector blower results in a decrease or, at least, a maintaining of temperature within the housing of the information handling system. However, a detected or estimated increase in ozone by the ion emitter/collector blower as detected by the execution of the intelligent ozone estimation and mitigation system may serve as a negative metric. To the extent that the additional voltage to the ion emitter of the ion emitter/collector blower results in a decrease in temperature, a heavier weight may be associated with this positive metric. However, to the extent that ozone estimation indicates that ozone levels have increased, a heavier weight may be associated with that negative metric.

The method 600, at block 650, also includes developing and calculating a total reward metric by subtracting a summation of weighted negative metrics from a summation of weighted positive metrics as indicated in the following example equation:

$$\sum_i w_i * r_i - \sum_i w_j * r_j \qquad \text{Eq. 1}$$

Where $w_i$ is the weight associated with a positive metric, $r_i$ and $w_j$ is the weight associated with a negative metric, $r_j$. This equation (e.g., Eq. 1) is used to calculate the total reward metric that is provided to the intelligent ozone estimation and mitigation system self-driving cooling system reinforcement learning agent.

At block 655, this total reward metrics is provided to the reinforcement learning algorithm of the self-driving cooling system reinforcement learning agent as input. The total reward metric describes, in an example embodiment, the effectiveness of the actions initiated by the self-driving cooling system reinforcement learning agent based on the previously detected operating characteristics of the information handling system by the user and operational states of the information handling system. With the total reward metrics, the customization or further customization of the policies associated with the self-driving cooling system reinforcement learning agent may be achieved.

At block 660, the self-driving cooling system reinforcement learning agent, via one or more sensors, may detect current operation states of the information handling system and operating characteristics of the information handling system by the user. It is noted, however, that these operating characteristics of the information handling system by the user and operational states of the information handling system may have changed since the self-driving cooling system reinforcement learning agent had detected them. For example, where the actions initiated previously by the self-driving cooling system reinforcement learning agent and executed via the ion emitter/collector blower and fan control system have changed the voltage applied to the ion emitter of the ion emitter/collector blower, changed the speed or rotation of the blades of the cooling fan, and the like, these operating characteristics of the information handling system by the user and operational states of the information handling system would be different than before the self-driving cooling system reinforcement learning agent had initiated the actions described herein.

The method 600 further includes, at block 665, developing and augmenting the policies of the self-driving cooling system reinforcement learning agent and initiates the actions resulting from those developments and augmentations based on the total reward metric, currently detected operational states of the information handling system, and the operating characteristics of the information handling system by the user's usage with the reinforcement learning algorithm. The developing and augmenting of the policies of the self-driving cooling system reinforcement learning agent may be conducted via the embedded controller executing the computer readable program code of the self-driving cooling system reinforcement learning agent. Because the reinforcement learning algorithm is reiterative in nature, the system for recommending actions for the ion emitter/collector blower and fan control system described in connection with block 640 through 665 may be adjusted any number of times for any duration by the self-driving cooling system reinforcement learning agent. Further, the adjustments may be ongoing, in an example embodiment, with the processes described in connection with blocks 640 through 665 being conducted so long as the information handling system is initiated.

At block 670, therefore, the method 600 includes determining if the information handling system is still initiated. Where the information handling system is still initiated, the method 600 includes iteratively conducting those processes described in connection with blocks 640 through 665. Where the information handling system is no longer initiated (e.g., power has been removed from the information handling system via actuation of a power button), the method 600 may end here. It is appreciated that as the policies are updated by the self-driving cooling system reinforcement learning agent via operation of blocks 640 through 665, those resulting updated policies may be saved on a memory device associated with the embedded controller executing the self-driving cooling system reinforcement learning agent.

The blocks of the flow diagrams of FIG. 5 as well as 6A and 6B or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a hardware processor;
   a memory device;
   a power management unit (PMU) to provide power to the processor and memory device;
   a fan and fan motor operatively coupled to a motor driver hardware operated by the hardware processor;
   an ion emitter/collector blower cooling system including:
      an ion emitter/collector blower, the ion emitter/collector blower including an ion emitter and an ion collector placed in fluidic series with the fan;
      an ionic driving circuit operatively coupled to the ion emitter via a high voltage to ionize gases at the ion emitter/collector blower to create charged ions that generate an airflow along a voltage field to and through the ion collector; and
   a hardware embedded controller to execute code instructions of a self-driving cooling system reinforcement learning agent of an ion emitter/controller blower and fan control system, the execution of the self-driving cooling system reinforcement learning agent to adjust and initiate operation of the ion emitter/collector blower and the fan based on metrics including operating characteristics of the information handling system from user workload, and based on operational states of the information handling system as determined in a learned policy to operate the ion emitter/collector blower and the fan.

2. The information handling system of claim 1 further comprising:
   the embedded controller to execute the code instructions of the self-driving cooling system reinforcement learning agent to prioritize the operation of the ion emitter/collector blower over initialization of the fan based on an operating mode of the information handling system being set to a quiet mode.

3. The information handling system of claim 1 further comprising:
   the embedded controller executing of the self-driving cooling system reinforcement learning agent by the embedded controller to determine a weighted total reward metric resulting from detected positive metrics and detected negative metrics resulting from actions executed by the embedded controller and the ion emitter/controller blower and fan control system to operate the ion emitter/collector blower and the fan for feedback into the self-driving cooling system reinforcement learning agent to update adjustments to the ion emitter/collector blower or the fan operation.

4. The information handling system of claim 1, wherein the execution of the self-driving cooling system reinforcement learning agent by the embedded controller subtracts a weighted negative metrics resulting from actions executed by the embedded controller to operate the ion emitter/collector blower and the fan from a weighted positive metrics resulting from actions executed by the embedded controller to operate the ion emitter/collector blower and the fan to determine feedback to a reinforcement learning algorithm for control of the ion emitter/collector blower and the fan.

5. The information handling system of claim 1 further comprising:
the embedded controller executing the ion emitter/collector blower and fan control system to further detect an operating mode, the operating mode including a performance mode requiring an increased level of processor resource utilization, and where the ion emitter/collector blower has reached a maximum operating capacity, the self-driving cooling system reinforcement learning agent initiates setting a fan speed of the fan to a mid-range airflow.

6. The information handling system of claim 5 further comprising:
the self-driving cooling system reinforcement learning agent initiates the ion emitter/collector blower and fan control system to control the fan speed from the mid-range airflow to a maximum airflow based on temperature feedback from a thermistor in the chassis.

7. The information handling system of claim 1 further comprising:
the self-driving cooling system reinforcement learning agent initiates the ion emitter/collector blower and fan control system to receive data describing a detected operating mode as not being performance mode and where the ion emitter/collector blower has reached a maximum operating capacity, the ion emitter/collector blower and fan control system then sets a fan speed of the fan to a low-range airflow.

8. An ion emitter/collector blower and fan cooling system for an information handling system comprising:
an ion emitter/collector blower, the ion emitter/collector blower including an ion emitter and an ion collector placed in fluidic series with a cooling fan;
an ionic driving circuit operatively coupled to the ion emitter via a high voltage to ionize gases at the ion emitter/collector blower to create charged ions that generate an airflow along a voltage field to and through the ion collector; and
an embedded controller to execute code instructions of a self-driving cooling system reinforcement learning agent and an ion emitter/collector blower and fan control system, the execution of the self-driving cooling system reinforcement learning agent to initiate operation of the ion emitter/collector blower and the cooling fan to based on feedback metrics including operating characteristics of the information handling system of usage workload and operational states of the information handling system iteratively input into a reinforcement learning algorithm to adjust the ion emitter/collector blower and fan control system control of the ion emitter/collector blower and of the cooling fan.

9. The ion emitter/collector blower and fan cooling system of claim 8 further comprising:
the embedded controller to execute code instructions of the self-driving cooling system reinforcement learning agent to prioritize the operation of the ion emitter/collector blower over initialization of the fan based on an operating mode of the information handling system being set to a quiet mode.

10. The ion emitter/collector blower and fan cooling system of claim 8 further comprising:
the embedded controller executing the self-driving cooling system reinforcement learning agent by the embedded controller to determine: a weighted rewards metric resulting from detected positive metrics and detected negative metrics resulting from actions executed by the embedded controller and the ion emitter/controller blower and fan control system to operate the ion emitter/collector blower and the cooling fan for feedback into the self-driving cooling system reinforcement learning agent to update adjustments to ion emitter/collector blower or the cooling fan operation.

11. The ion emitter/collector blower and fan cooling system of claim 8, wherein the execution of the self-driving cooling system reinforcement learning agent by the embedded controller subtracts weighted negative metrics resulting from actions executed by the embedded controller to operate the ion emitter/collector blower and the cooling fan from weighted positive metrics resulting from actions executed by the embedded controller to operate the ion emitter/collector blower and the cooling fan to determine feedback to a reinforcement learning algorithm for control of the ion emitter/collector blower and the cooling fan.

12. The ion emitter/collector blower and fan cooling system of claim 8 further comprising:
the embedded controller executing the ion emitter/collector blower and fan control system to detect an operating mode of the information handling system is a performance mode requiring an increased level of processor resource utilization and to detect that the ion emitter/collector blower has reached a maximum operating capacity, and the self-driving cooling system reinforcement learning agent initiating setting a fan speed of the cooling fan to a mid-range airflow based on the operating mode being a performance mode.

13. The ion emitter/collector blower and fan cooling system of claim 12 further comprising:
the embedded controller executing the ion emitter/collector blower and fan control system to control the fan speed from the mid-range airflow to a maximum airflow based on initiation from the self-driving cooling system reinforcement learning system detecting temperature feedback from a thermistor in a chassis of the information handling system and applying learned policy for operating the cooling fan.

14. The ion emitter/collector blower and fan cooling system of claim 13 further comprising:
the embedded controller executing the ion emitter/collector blower and fan control system to detect an operating mode is not the performance mode and that the ion emitter/collector blower has reached & the maximum operating capacity; and
the embedded controller executing the self-driving cooling system reinforcement learning system to set the fan speed of the fan to a low-range airflow based on learned policy for operating the fan.

15. An information handling system comprising:
a hardware processor;
a memory device;
a power management unit (PMU) to provide power to the processor and memory device;
a fan operatively coupled to a fan motor and motor driver hardware;
an ion emitter/collector blower cooling system including:
   an ion emitter/collector blower, the ion emitter/collector blower including an ion emitter and an ion collector placed in fluidic series with the fan;
an ionic driving circuit operatively coupled to the ion emitter via a high voltage to ionize gases at the ion emitter/collector blower to create charged ions that generate an airflow along a voltage field to and through the ion collector; and
an embedded controller to execute code instructions of an ion emitter/collector blower and fan control system including a self-driving cooling system reinforcement learning agent, the execution of the self-driving cooling system reinforcement learning agent initiating operating adjustments to the ion emitter/collector blower and the fan based on feedback metrics including usage workload operating characteristics of the information handling system and operational states of the information handling system input into a reinforcement learning algorithm to adjust learned control policy of the ion emitter/collector blower and of the fan,
wherein the embedded controller executes code instructions of the self-driving cooling system reinforcement learning agent to prioritize the operation of the ion emitter/collector blower over initialization of the fan.

16. The information handling system of claim 15 further comprising:
the execution of code instructions of the self-driving cooling system reinforcement learning agent by the embedded controller to determine weighted positive metrics and weighted negative metrics resulting from actions of the ion emitter/collector blower and fan control system executed by the embedded controller to operate the ion emitter/collector blower and the fan.

17. The information handling system of claim 15, wherein the execution of code instructions of the self-driving cooling system reinforcement learning agent by the embedded controller subtracts the weighted negative metrics from weighted positive metrics resulting from actions executed by the embedded controller to operate the ion emitter/collector blower and the fan to generate a weighted total reward metric as feedback input into a reinforcement learning algorithm.

18. The information handling system of claim 15 further comprising:
the execution of code instructions of the ion emitter/collector blower and fan control system to detect an operating mode, the operating mode being a performance mode requiring an increased level of processor resource utilization and where the ion emitter/collector blower has reached a maximum operating capacity, the self-driving cooling system reinforcement learning agent recommends to set a fan speed of the fan to a mid-range airflow.

19. The information handling system of claim 18 further comprising:
the execution of code instructions of the self-driving cooling system reinforcement learning agent recommends to the ion emitter/collector blower and fan control system to control the fan speed from the mid-range airflow to a maximum airflow based on temperature feedback from a thermistor in a chassis of the information handling system.

20. The information handling system of claim 19 further comprising:
the execution of code instructions of the ion emitter/collector blower and fan control system to detect an operating mode as not being the performance mode and; that the ion emitter/collector blower has reached the maximum operating capacity, and execution of code instructions of the self-driving cooling system reinforcement learning agent recommends to set the fan speed of the fan to a low-range airflow.

* * * * *